(12) United States Patent
Nagashima et al.

(10) Patent No.: US 9,351,372 B2
(45) Date of Patent: May 24, 2016

(54) LIGHTING DEVICE AND LIGHTING SYSTEM

(75) Inventors: Mitsunori Nagashima, Kyoto (JP); Hironobu Kaneko, Kyoto (JP); Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 360 days.

(21) Appl. No.: 13/981,133

(22) PCT Filed: Jan. 23, 2012

(86) PCT No.: PCT/JP2012/051289
§ 371 (c)(1),
(2), (4) Date: Jul. 23, 2013

(87) PCT Pub. No.: WO2012/102219
PCT Pub. Date: Aug. 2, 2012

(65) Prior Publication Data
US 2013/0293118 A1    Nov. 7, 2013

(30) Foreign Application Priority Data

Jan. 28, 2011 (JP) ................................. 2011-016900
Apr. 18, 2011 (JP) ................................. 2011-091675
Apr. 19, 2011 (JP) ................................. 2011-092941

(51) Int. Cl.
*H05B 37/02* (2006.01)

(52) U.S. Cl.
CPC ............ *H05B 37/02* (2013.01); *H05B 37/0272* (2013.01); *H05B 37/0227* (2013.01)

(58) Field of Classification Search
CPC . H05B 37/02; H05B 37/0227; H05B 37/0272
USPC ......... 315/155, 297, 291, 129, 130, 152, 149, 315/318, 312, 308; 340/514, 12.32, 3.5
See application file for complete search history.

(56) References Cited

U.S. PATENT DOCUMENTS

| 2008/0063410 | A1* | 3/2008 | Irie | H04B 10/116 398/182 |
| 2009/0212718 | A1* | 8/2009 | Kawashima | H05B 37/0218 315/297 |
| 2010/0259193 | A1* | 10/2010 | Umezawa | H05B 37/034 315/297 |
| 2010/0283401 | A1* | 11/2010 | Chung | H05B 37/0263 315/250 |
| 2012/0001567 | A1* | 1/2012 | Knapp | H04L 12/282 315/291 |

FOREIGN PATENT DOCUMENTS

| JP | H11-067469 A | 3/1999 |
| JP | 2002-260876 | 9/2002 |
| JP | 2004-303510 | 10/2004 |
| JP | 2005-071873 A | 3/2005 |

(Continued)

OTHER PUBLICATIONS

Japanese Patent Office, International Search Report for International Application PCT/JP2012/051289 (Apr. 24, 2012).

*Primary Examiner* — Lincoln Donovan
*Assistant Examiner* — Thomas Skibinski
(74) *Attorney, Agent, or Firm* — Fish & Richardson P.C.

(57) ABSTRACT

This lighting device comprises a light-emitting unit, a reception unit for receiving information from an adjacent lighting device, and a control unit for letting the light-emitting unit emit light according to the information received by the reception unit.

20 Claims, 10 Drawing Sheets

(56) References Cited

FOREIGN PATENT DOCUMENTS

| | | |
|---|---|---|
| JP | 2005-259431 A | 9/2005 |
| JP | 2007-321387 A | 12/2007 |
| JP | 2008-027822 A | 2/2008 |
| JP | 2009-205841 | 9/2009 |
| JP | 2009-266424 | 11/2009 |
| JP | 2009-295399 A | 12/2009 |
| JP | 2010-147014 A | 7/2010 |
| JP | 2010-251030 | 11/2010 |
| JP | 2010-257611 A | 11/2010 |
| WO | 2010/067654 | 6/2010 |

* cited by examiner

LIGHTING DEVICE AND LIGHTING SYSTEM

TECHNICAL FIELD

The present invention relates to lighting devices and lighting systems.

BACKGROUND ART

Conventionally, various lighting devices have been proposed for various purposes. As the light source in lighting devices, while fluorescent lamps are common, in recent years, LEDs are also increasingly used. Also as to the control of lighting devices, various proposals have been made. For example, according to one proposal, in a lighting system, based on various kinds of detected information on the ambient environment of lighting appliances, a plurality of lighting appliances are controlled to achieve lighting control more suitable to the ambient environment of the lighting appliances; moreover, increased flexibility in system design is achieved (Patent Document 1). According to another proposal, control based on a human detection sensor is achieved (Patent Document 2).

LIST OF CITATIONS

Patent Literature

Patent Document 1: Japanese Patent Application Publication No. 2009-205841
Patent Document 2: Japanese Patent Application Publication No. 2009-266424

SUMMARY OF THE INVENTION

Technical Problem

However, as to the control of lighting devices, there are many problems that deserve further study.

In view of the above, the present invention aims to provide a lighting device and a lighting system that allow useful control.

Problem to be Solved by the Invention

A lighting device disclosed in the present description is so configured as to include: a light emission portion; a reception portion for receiving information from an adjacent lighting device; and a control portion for making the light emission portion emit light according to the information received by the reception portion (a first configuration).

Preferably, the lighting device according to the first configuration described above is so configured as to further include a commanding portion for commanding forwarding of the information received by the reception portion to another adjacent lighting device (a second configuration).

Preferably, the lighting device according to the first configuration described above is so configured as to further include a first reception portion that can receive a first control signal from a portable external remote control unit, that the reception portion serves as a second reception portion that can receive a second control signal from the adjacent lighting device, and that the control portion controls the light emission portion based on signals received by the first and second reception portions (a third configuration).

Preferably, the lighting device according to the third configuration described above is so configured as to further include a commanding portion that, when the first control signal is a signal for turning off the light emission portion, commands forwarding of, as the second control signal, a signal for turning off the adjacent lighting device to the adjacent lighting device and, when the first control signal is a signal for turning on the light emission portion, commands forwarding of, as the second control signal, a signal for turning on the adjacent lighting device to the adjacent lighting device (a fourth configuration).

Preferably, the lighting device according to the third configuration described above is so configured that, when the first control signal is a signal for turning on the light emission portion, forwarding of, as the second control signal, a signal for turning off the adjacent lighting device to the adjacent lighting device is commanded (a fifth configuration).

A lighting device disclosed in the present description is so configured as to include: a light emission portion; a human detection sensor; a control signal reception portion for receiving a control signal; and a control portion for controlling the lighting state of the light emission portion based on the control signal received by the control signal reception portion and the human detection state of the human detection sensor (a sixth configuration).

Preferably, the lighting device according to the sixth configuration described above is so configured that the control signal is contained in the illumination light of an external lighting device, and that the control portion controls the light emission portion to forward the control signal to the external lighting device (a seventh configuration).

Preferably, the lighting device according to the sixth configuration described above is so configured that the control signal is transferred from the external lighting device by power line communication (an eighth configuration).

Preferably, the lighting device according to the seventh configuration described above is so configured that the control signal reception portion receives information from an adjacent lighting device, and that, while no human detection by the human detection sensor is present, when the reception portion receives information indicating that the adjacent lighting device has been turned on, the control portion makes the light emission portion emit light with light weaker than in a normally on state (a ninth configuration).

Preferably, the lighting device according to the sixth configuration described above is so configured that, while the light emission portion is emitting light, when human detection by the human detection sensor ceases to be present, if the reception portion has received information indicating that the adjacent lighting device is on, the control portion makes the light emission portion continue light emission (a tenth configuration).

Preferably, the lighting device according to the sixth configuration described above is so configured that, until the control signal reception portion newly receives a control signal, the control portion maintains the previous control state (an eleventh configuration).

Preferably, the lighting device according to the sixth configuration described above is so configured that the control signal reception portion receives a control signal from an external remote control unit (a twelfth configuration).

Preferably, the lighting device according to the sixth configuration described above is so configured that the control signal reception portion receives a control signal from an external other lighting device (a thirteenth configuration).

Preferably, the lighting device according to the sixth configuration described above is so configured that the control portion has a plurality of control modes, and has a signal transmission portion for transmitting information of the control mode adopted by the control portion to an external other lighting device (a fourteenth configuration).

Preferably, the lighting device according to the fourteenth configuration described above is so configured that one of the plurality of control modes is a mode where the lighting state of the light emission portion is controlled based on the human detection state of the human detection sensor at the time point that the control signal reception portion receives a control signal, and that, in another of the plurality of control modes, the control portion controls the lighting state of the light emission portion at the time point that a change occurs in the human detection state of the human detection state (a fifteenth configuration).

Preferably, the lighting device according to the fourteenth configuration described above is so configured that the signal transmission portion controls the lighting state of the light emission portion so as to transmit a signal to the external other lighting device by use of visible light from the light emission portion (a sixteenth configuration).

A lighting device disclosed in the present description is so configured as to include: a light emission portion; a control signal reception portion for receiving a control signal; a control portion for controlling the lighting state of the light emission portion based on the control signal received by the control signal reception portion; and a signal transmission portion for transmitting the lighting state of the light emission portion to an external other lighting device (a seventeenth configuration).

Preferably, the lighting device according to the seventeenth configuration described above is so configured that the control signal reception portion receives from an external remote control unit a control signal with a limited reachable range (an eighteenth configuration).

Preferably, the lighting device according to the seventeenth configuration described above is so configured that, until the control signal reception portion newly receives a control signal, the control portion maintains previous control state (nineteenth configuration).

A lighting system disclosed in the present description is so configured as to include a plurality of the lighting device according to the seventeenth configuration described above (a twentieth configuration).

Advantageous Effects of the Invention

As described above, according to the present invention, it is possible to provide a lighting device and a lighting system that allow useful control through coordination among a plurality of lighting devices.

DESCRIPTION OF EMBODIMENTS

Figure 1:
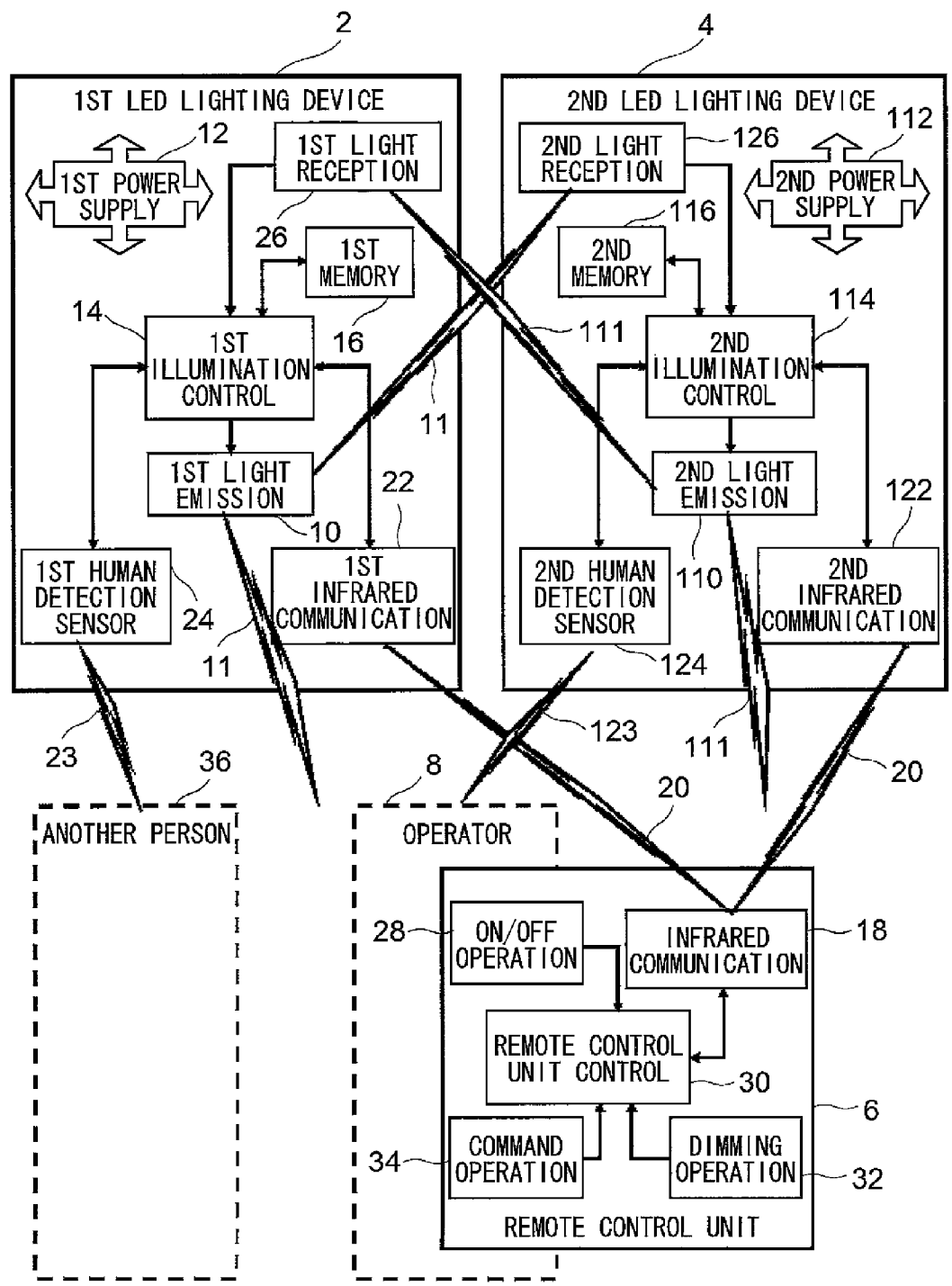
FIG. 1 is a block diagram showing an example of a lighting device according to an embodiment of the invention.

FIG. 1 is a block diagram showing an example of a lighting device according to an embodiment of the invention. The example includes a plurality of independently controllable LED lighting devices and remote control units; for simplicity's sake, however, FIG. 1 only shows two—a first and a second—lighting devices, of which the relationship with a single remote control unit 6 will be discussed. It is assumed that the first and second LED lighting devices 2 and 4 are arranged adjacent to each other on a ceiling. It is assumed that the remote control unit 6 is operated by an operator 8. The internal configuration of the lighting devices will be described with respect to the first LED lighting device 2, and for the second LED lighting device 4, which is configured identically, reference numerals having "1" in the hundred's digit followed by common figures in the ten's and one's digits will be used, with no separate discussion given unless necessary.

The first LED lighting device 2 has a first light emission portion 10 which generates visible illumination light 11, and emits light by being fed with electric power from a first power supply portion 12, which is connected to a household power line. The light emission by the first light emission portion 10 is controlled by a first illumination control portion 14 which includes a microprocessor or the like. A first memory portion 16 stores programs for execution of the functions of the first illumination control portion 14, and temporarily stores various pieces of data needed for control. The first illumination control portion 14 turns on and off the light emission by the first light emission portion 10 and performs brightness adjustment (hereinafter referred to as "dimming") according to a signal from a first infrared communication portion 22 which receives infrared light 20 from an infrared communication portion 18 of the remote control unit 6.

Not only via control from the remote control unit 6 as mentioned above, but also in response to a detection signal from a first human detection sensor 24, the first illumination control portion 14 turns on and off the light emission by, and performs dimming on, the first light emission portion 10. Specifically, the first human detection sensor 24 detects infrared radiation 23 from the human body to yield a detection signal that indicates human presence/absence within a predetermined range directly under the illumination of the first light emission portion 10, and according to the detection signal from the first human detection sensor 24, the first illumination control portion 14 turns on and off the light emission by, and performs dimming on, the first light emission portion 10. Also in response to a detection signal from a first light reception portion 26 which receives visible illumination light 111 from a second light emission portion 110 of the adjacent second LED lighting device 4, the first illumination control portion 14 turns on and off the light emission by, and performs dimming on, the first light emission portion 10. Likewise, in response to a detection signal from a second light reception portion 126 which intercepts the visible illumination light 11 from the first light emission portion 10 of the first LED lighting device 2, a second illumination control portion 114 of the second LED lighting device 4 turns on and off the light emission by, and performs dimming on, the second light emission portion 110.

The dimming of the first and second light emission portions 10 and 110 is achieved through the varying of the duty cycle by PWM control. Here, by varying the timing of control pulses for PWM control in a way that does not change the overall duty cycle which determines brightness, control information is superimposed on the visible illumination light 11 or 111 from the first or second light emission portion 10 or 110. The first or second light reception portion 26 or 126 intercepts the counterpart's visible illumination light 11 or 111, thus having the control information superimposed on it, to detect the control information. How this exchange of reciprocal control information by visible illumination light proceeds will be described in detail later. Incidentally, when a control signal needs to be transmitted at the time point that the first or second light emission portion 10 or 110 is turned off, prior to the turning off, the first or second light emission portion 10 or 110 continues light emission with the visible illumination light 11 or 111 superimposed, and is then turned off.

In the remote control unit 6, under the control of an on/off operation portion 28, a remote control unit control portion 30 makes the infrared communication portion 18 transmit infrared light 20 for turning the lighting devices on and off. Moreover, according to how a dimming operation portion 32 is operated, the remote control unit control portion 30 makes the infrared communication portion 18 transmit infrared light 20 for dimming the lighting devices. Furthermore, according to how a command operation portion 34 is operated, the remote control unit control portion 30 makes the infrared communication portion 18 transmit infrared light 20 for changing the lighting state. In the control described above, each lighting device can be set for a different channel so that, by making the infrared communication portion 18 transmit infrared light 20 containing channel specifying information, the lighting devices can be controlled individually.

With the configuration described above, in the state shown in FIG. 1, the operator 8 etc. are located as follows. The operator 8 is so located as to be detected by a second human detection sensor 124 of the second LED lighting device 4, and the infrared light 20 from the remote control unit 6 operated by the operator 8 is so located as to be detected by the first infrared communication portion 22 of the first LED lighting device 2 and by a second infrared communication portion 122 of the first LED lighting device 2. It should be noted that the operator 8 is not so located as to be detected by the first human detection sensor 24 of the first LED lighting device 2. On the other hand, another person 36 in the same room is so located as to be detected by the first human detection sensor 24 of the first LED lighting device 2 but not to be detected by the second human detection sensor 124 of the second LED lighting device 4.

Next, lighting control in the state described above will be described. First, in a human-detecting partial lighting mode, when the operator 8 so operates the on/off operation portion 28 as to turn on the lighting devices, the infrared light 20 from the remote control unit 6 is detected by the second infrared communication portion 122 of the second LED lighting device 4, and in addition the second human detection sensor 124 detects infrared radiation 123 from the operator 8; thus, the second illumination control portion 114 turns on the second light emission portion 110. On the other hand, the infrared light 20 from the remote control unit 6 is detected also by the first infrared communication portion 22 of the first LED lighting device 2, and in addition the first human detection sensor 24 detects infrared radiation 23 from the other person 36 in the same room; thus, the first illumination control portion 14 turns on the first light emission portion 10. Here, if the other person 36 in the same room is absent, the infrared light 20 from the remote control unit 6 will invariably be detected by the first infrared communication portion 22 of the first LED lighting device 2, but, with no detection by the first human detection sensor 24 present, the first illumination control portion 14 will not turn on the first light emission portion 10. In this way, in the human-detecting partial lighting mode, the first and second illumination control portions 14 and 114 turn on or off the first and second light emission portions 10 and 110 respectively according to the detection status of infrared light 20 from the remote control unit 6 and of infrared radiation 23 and 123 from the human body. It should be noted that, in the above description, the control functions based on exchange of reciprocal control information by visible illumination light in the first and second light reception portions 26 and 126 are omitted FIGS. 2 to 5 are lighting status block diagrams illustrating different control statuses observed in a case where six lighting devices 2, 4, 40, 42, 44, and 46 are arranged on a ceiling and are controlled with a single remote control unit 6. Each lighting device is configured as shown in FIG. 1. However, FIGS. 2 to 5 are directed to simple control modes, where lighting control is performed without using the function of human detection sensors 24, 124, etc., and accordingly such sensors are omitted from illustration. Moreover, the following description discusses, on a concluding basis, the cause-effect relationships between, at one end, detection by the individual light-reception portions and by the individual infrared-communication portions and, at the other end, turning on or off of the individual light emission portions, and accordingly the individual control portions that perform intermediary control therefor are also omitted from illustration.

Under the assumptions discussed above, with reference to FIGS. 2 to 5, a description will now be given of control based on the detectable range of the infrared light 20 from the remote control unit 6 and the exchange of reciprocal control information by visible illumination light. In FIGS. 2 to 5, a light emission portion indicated by a bold-lined box is to be understood to be emitting light, and a light emission portion indicated by a fine-lined box is to be understood to be extinguished. Solid-line-contoured thick hollow arrows, and solid-line arrows between blocks, indicate the flow of control signals that have caused light emission portions to be turned on. On the other hand, broken-line-contoured thick hollow arrows, and broken-line arrows between blocks, indicate the flow of control signals that have caused light emission portions to be turned off. Moreover, parenthesized numbers inside hollow arrows indicate the chronological order where multiple cause-effect relationships occur in succession. In each block, to avoid complexity, the numbers of individual blocks within the LED lighting devices are omitted unless necessary for description.

Figure 2:
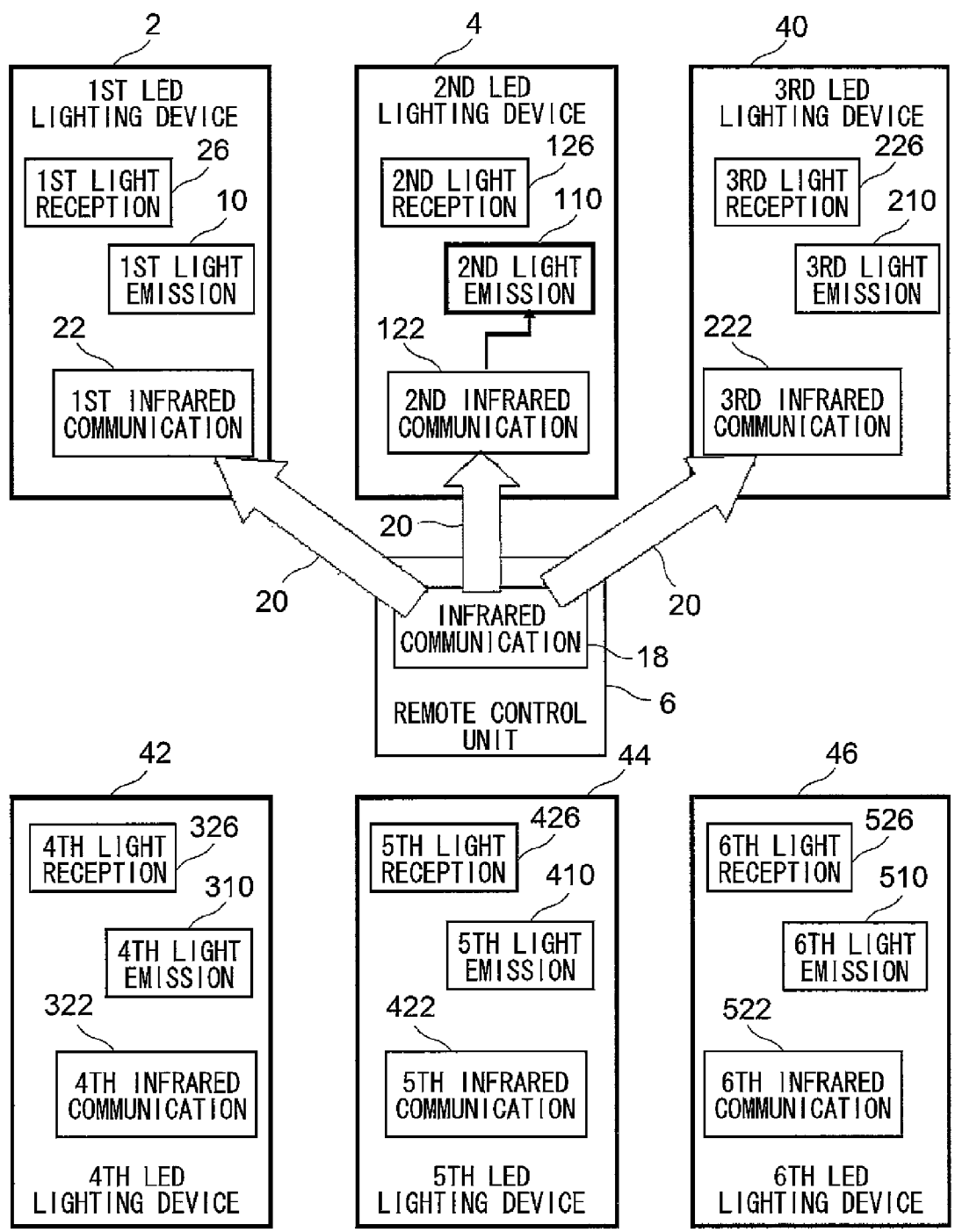
FIG. 2 is a lighting status block diagram in a simple independent mode with a plurality of lighting devices.

First, FIG. 2 is a lighting status block diagram in a simple independent mode. The simple independent mode is a mode where no human detection sensor is involved and in addition the infrared communication portion 18 transmits infrared light 20 specifying a channel. FIG. 2 shows an example where infrared light 20 specifying the second LED lighting device 4 is being transmitted and where, accordingly, based on the output of the second infrared communication portion 122 located within the reachable range of the infrared light 20 and having detected the infrared light 20 specifying the channel of the second infrared communication portion 122 itself, the second light emission portion 110 is turned on. The first and third infrared communication portions 22 and 222 are also located within the reachable range of the same infrared light 20 and are receiving it, but since their own channels are not specified, they do not make the first and third light emission portions 10 and 210 emit light. The fourth, fifth, and sixth infrared communication portions 322, 422, and 522 are not located within the reachable range of the infrared light 20 in the first place, and accordingly they do not turn on the fourth, fifth, and sixth light emission portions 310, 410, and 510.

Figure 3:
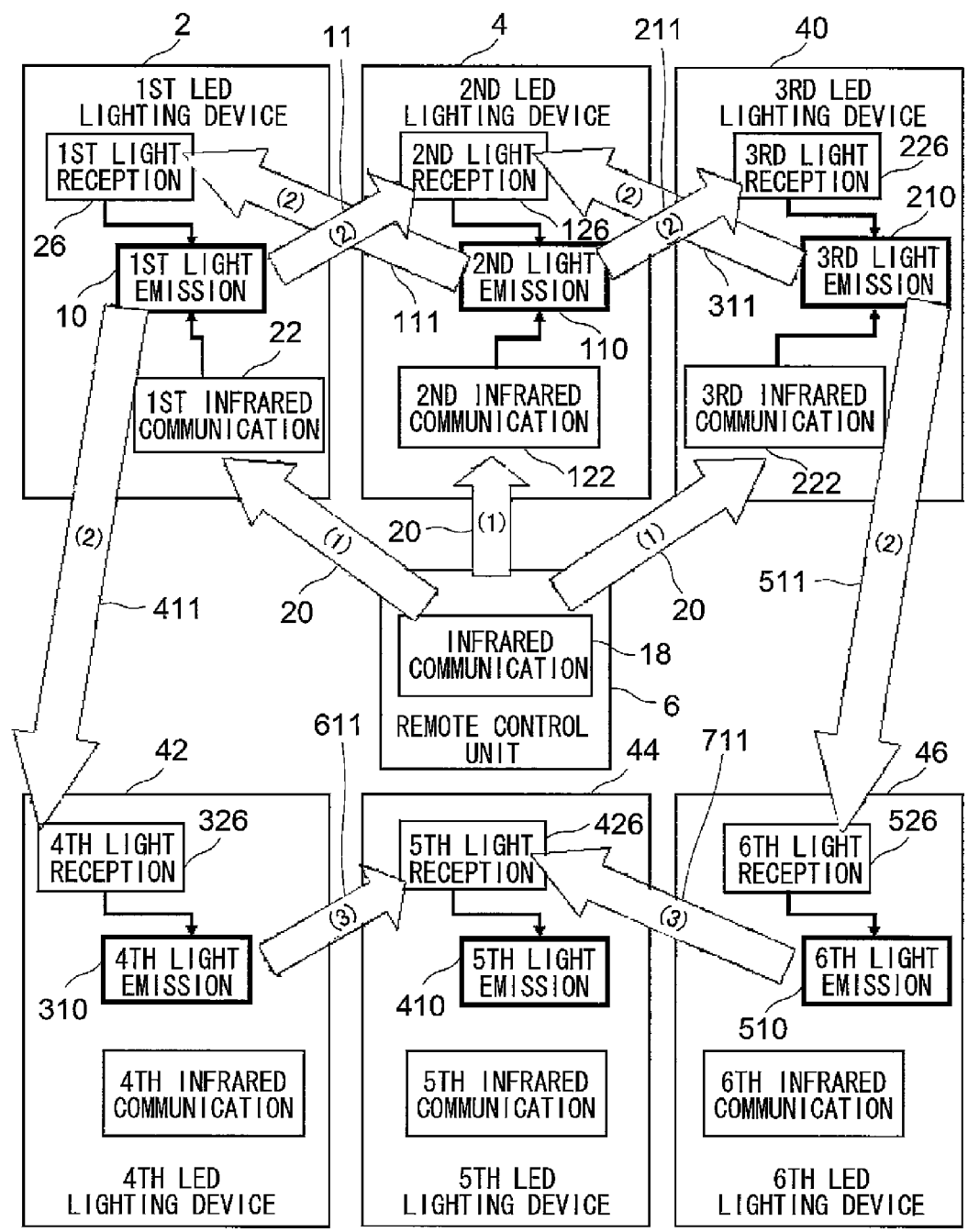
FIG. 3 is a lighting status block diagram in a coordinated all-device control mode with a plurality of lighting devices.

FIG. 3 is a lighting status block diagram in a coordinated general control mode. The coordinated general control mode is a mode where individual LED lighting devices are operated in a coordinated fashion, or in succession, so that wherever the remote control unit 6 may be operated and the infrared light 20 may be transmitted from, all the LED lighting devices are turned on or off in a coordinated fashion. While FIG. 3 is directed to control for turning on, which will now be described, control for turning off proceeds in a similar manner. It is assumed that the location of the remote control unit 6 is such that, as in FIG. 2, the first, second, and third infrared communication portions 22, 122, and 222 are located within the reachable range of the same infrared light 20. In the coordinated general control mode, the infrared light 20 is transmitted via a coordinated channel which is set to be common to all the LED lighting devices. The coordinated channel may double as the channel specifying any of the individual LED lighting devices. Thus, depending on the mode, the individual LED lighting devices are controlled in response to their own channels or the coordinated channel, whichever is specified; in the coordinated general control mode, they are set to respond to the coordinated channel.

Under the assumptions discussed above, when infrared light 20 is transmitted via the coordinated channel, as indicated by succession order (1), first, the first, second, and third infrared communication portions 22, 122, and 222, which are located within the reachable range of the infrared light 20, detect it, and turn on the first, second, and third light emission portions 10, 110, and 210 respectively. At this time, as indicated by succession order (2), the visible illumination light 11 from the first light emission portion 10, the visible illumination light 111 and 211 from the second light emission portion 110, and the visible illumination light 311 from the second light emission portion 210 are received by the adjacent ones of the first, second, and third light reception portions 26, 126, and 226 respectively; thus, control is performed such that the LED lighting devices receive infrared light each from any adjacent one to turn on the first, second, and third light emission portions 10, 110, and 210 respectively. It should be noted that, so long as the LED lighting devices are already normally on through reception of the infrared light 20, nothing happens through the above-described control by visible light communication.

However, if any of the first, second, and third infrared communication portions 22, 122, and 222 happens to be faulty and unable to effect turning-on, then, as a fail-safe function, the above-described reciprocal control by visible light communication will enables turning-on. For example, if the second infrared communication portion 122 is faulty, the control (1) by the infrared light 20 from the remote control unit 6 to the second LED lighting device 4 cannot effect turning-on. At this time, however, the control (1) from the remote control unit 6 to the first or second LED lighting device 2 or 40, and the succeeding control (2) by the visible illumination light 11 or 311 from the first or second LED lighting device 2 or 40 to the second LED lighting device 4, turn on the second LED lighting device 4.

The succeeding control (2) by visible light communication to the second LED lighting device 4 occurs with respect to those adjacent to it on both sides; thus, in the situation mentioned above, if the fault is so serious that the first light emission portion 10 of the first LED lighting device 2 also fails to be turned on, then the control (1) from the remote control unit 6 to the third LED lighting device 40, and the succeeding control (2) by the visible light 311 from the third LED lighting device 40 to the second LED lighting device 4, function as a fail-safe path, allowing the second LED lighting device 4 to be turned on. In the above description based on FIG. 3, a mention is made only of the relationship between the second LED lighting device 4 and the first and third LED lighting devices 2 and 40 adjacent to it on both sides. In general, for example in a case where a plurality of LED lighting devices are arranged in a matrix-like formation, for each LED lighting device, a plurality of fail-safe paths exist— basically four paths to those adjacent to it in four directions; for an LED lighting device on any of the four sides of the matrix, three paths; and for an LED lighting device in any of the four corners of the matrix, two paths. Furthermore, while the above description only mentions communication between adjacent LED lighting devices for simplicity's sake, in practice reciprocal control by visible light communication is possible even between mutually remote LED lighting devices so long as sufficient light intensity can be secured within the direct and indirect illustration ranges of their respective light emission portions, and thus there exist more fail-safe paths.

Next, lighting control for the fourth, fifth, and sixth LED lighting devices 42, 44, and 46 will be described. As described above, through the control (1) from the remote control unit 6 to the first or third LED lighting device 2 or 40, the first and third LED lighting devices 10 and 210 are turned on. Thus, with respect to the LED lighting devices adjacent to them and located in their illumination ranges, namely the fourth and sixth LED lighting devices 42 and 46, the control (2) by visible light 411 and 511 respectively succeed. Thus, the fourth and sixth light reception portions 326 and 526, which intercept the visible light from the first and third light emission portions 10 and 210, turn on the fourth and sixth light emission portions 310 and 510 respectively. Succeeding this turning-on, the control (3) by visible light 611 and 711 from the fourth or sixth LED lighting device 42 or 46 to the fifth LED lighting device 44 occurs, and thus the fifth light reception portion 426, which intercepts the visible light 611 or 711 from the fourth or sixth light emission portion 611 or 711, turns on the fifth light emission portion 410. In this case also, two paths exist across which the fifth light emission portion 410 can be turned on, each path functioning as a fail-safe path to the other.

Figure 4:
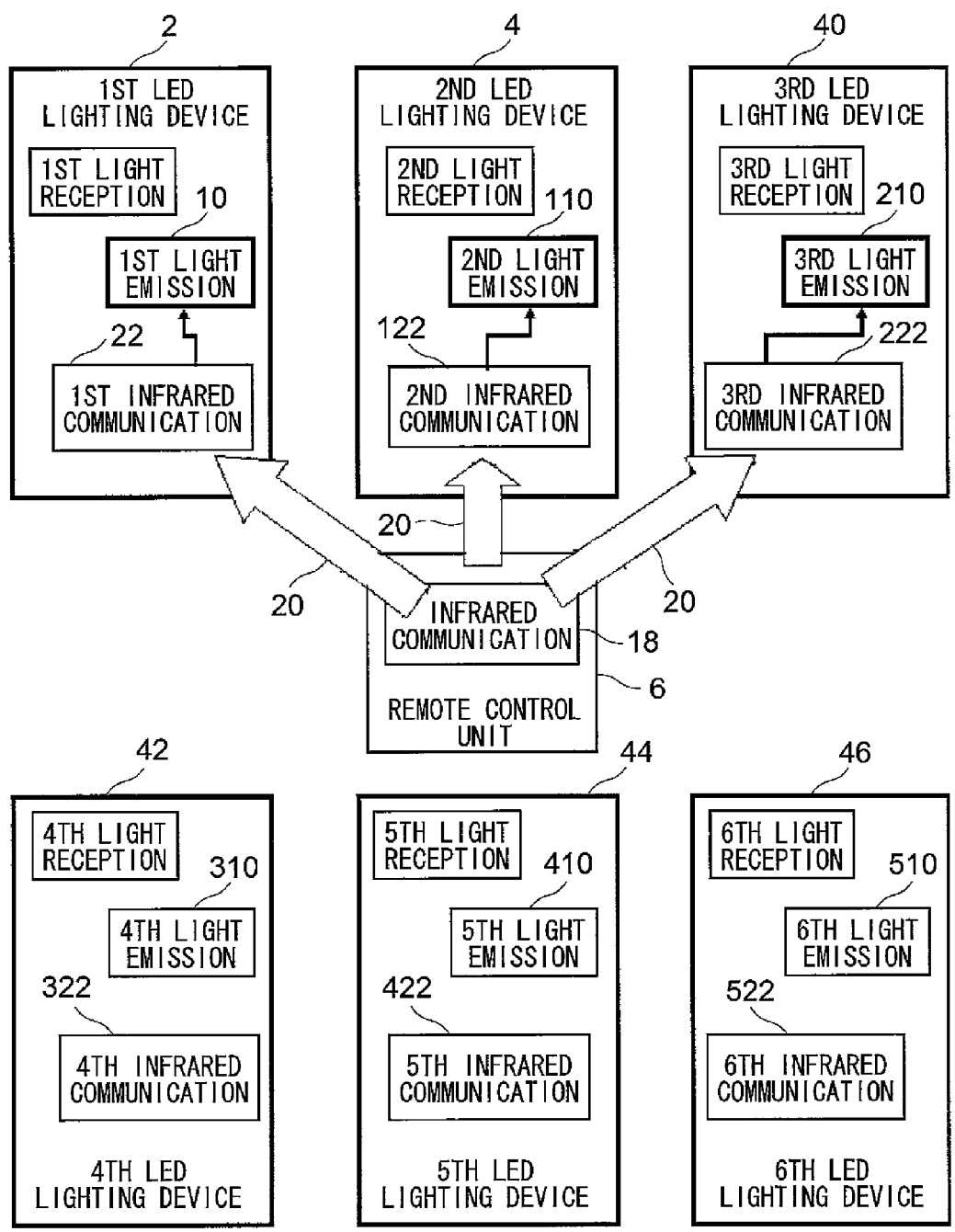
FIG. 4 is a lighting status block diagram showing a state where a first part is lit in a coordinated partial control mode with a plurality of lighting devices.
Figure 5:
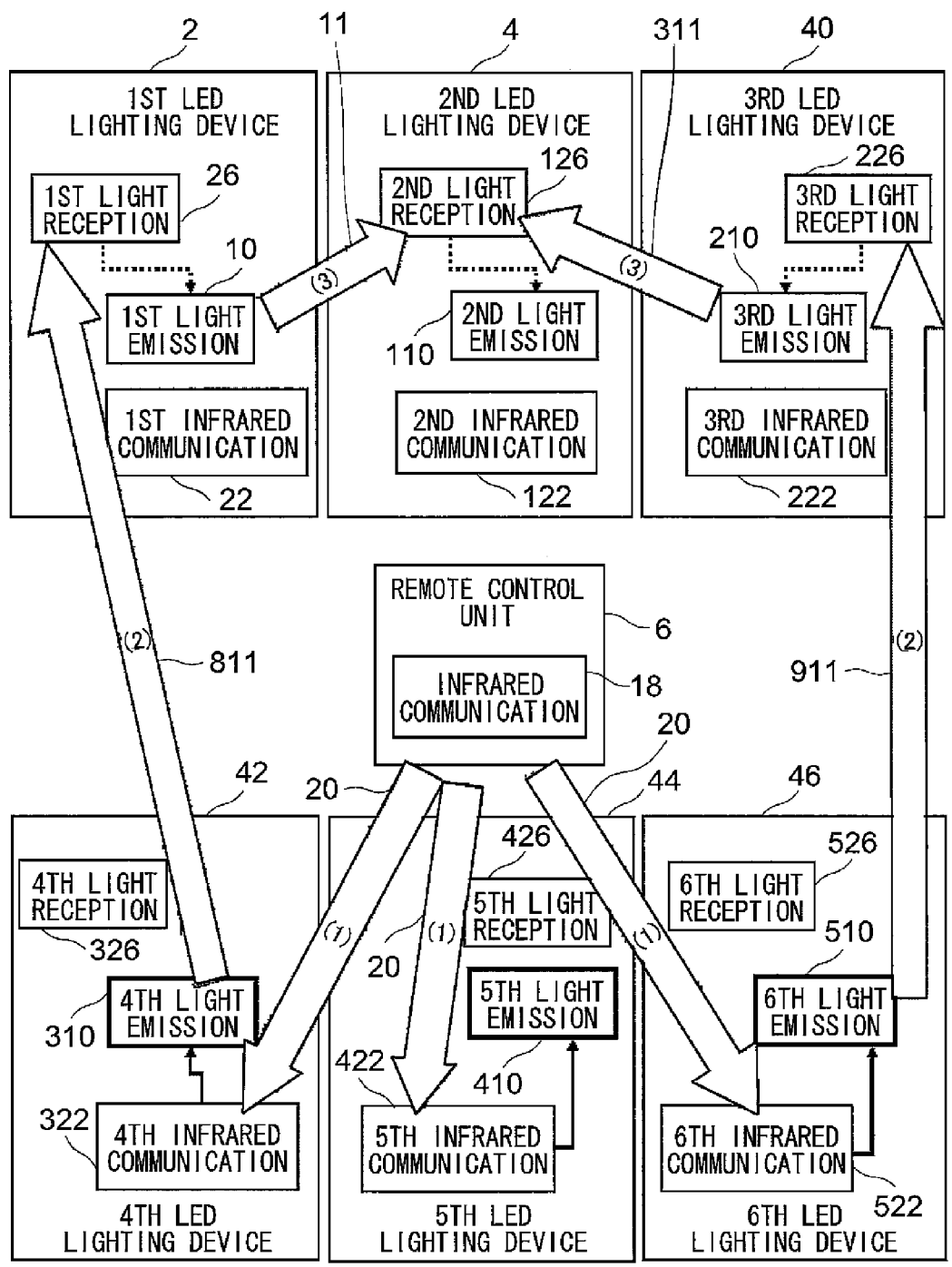
FIG. 5 is a lighting status block diagram showing a state after the lit part has been changed to a second part in a coordinated partial control mode with a plurality of lighting devices.

FIGS. 4 and 5 are lighting status block diagrams in a coordinated partial control mode. FIG. 4 shows a state where, of the illumination range of a plurality of LED lighting devices, a first part (the part to which LED lighting devices 2, 4, and 40 belong) is lit, and FIG. 5 shows a state, where the lit part has been changed to a second part (the part to which LED lighting devices 42, 44, and 46 belong). The change of the lit part is possible by changing the location where the remote control unit 6 is operated; basically, those LED lighting devices which are located near the remote control unit 6 are turned on, while those LED lighting devices which are located away from the remote control unit 6 are turned off.

First, the state shown in FIG. 4 will be described. In the state shown in FIG. 4, it is assumed that an operator holding the remote control unit 6 is located in the vicinity of the first, second, and third LED lighting devices 2, 4, and 40. When, in this state, the remote control unit 6 is operated and the infrared light 20 is transmitted via the coordinated channel in the coordinated partial control mode, the first, second, and third infrared communication portions 22, 122, and 222 located within the reachable range of the infrared light 20 detect it, and turn on the first, second, and third light emission portions 10, 110, and 210 respectively. In the coordinated partial control mode, no succeeding lighting control occurs, and thus the control is now ended. Incidentally, turning on an LED lighting device incites coordination by visible light for turning off an already turned-on LED lighting device outside the reachable range of the infrared light 20; in FIG. 4, however, there is no relevant LED lighting device, and therefore such succession will be discussed later with reference to FIG. 5.

In the state shown in FIG. 4, the operator holding the remote control unit 6 is located away from the fourth, fifth, and sixth LED lighting devices 42, 44, and 46, and thus the fourth, fifth, and the sixth infrared communication portions 322, 422, and 522 are not located within the reachable range of the infrared light 20 in the first place. Accordingly, even when the remote control unit 6 is operated via the coordinated channel, the fourth, fifth, and sixth light emission portions 310, 410, and 510 are not turned on.

Next, suppose that, from the state shown in FIG. 4, the operator 8 moves away from the first, second, and third LED lighting devices 2, 4, and 40 into the vicinity of the fourth, fifth, and sixth LED lighting devices 42, 44, and 46, where the operator then operates the remote control unit 6 to make a turning-on operation. FIG. 5 shows the lighting state that results from that operation. When, as a result of the turning-on operation, infrared light 20 is transmitted via the coordinated channel in the coordinated partial control mode as indicated by succession order (1), the fourth, fifth, and sixth infrared communication portions 322, 422, and 522, which are located in the reachable range of the infrared light 20, detect it, and turn on the fourth, fifth, and sixth light emission portions 310, 410, and 510 respectively. The succession for turning-on is thus ended, but since the first, second, and third LED lighting devices 2, 4, and 40 have been on in FIG. 4, succession for turning these off now occurs.

Specifically, when the fourth and sixth light emission portions 310 and 510 are turned on, as indicated by succession order (2), the coordinated turning-off signals by visible light 811 and 911 from the fourth and sixth light emission portions 310 and 510 are received by the adjacent light reception portions respectively, namely the first and third light reception portions 26 and 226. The first and third light emission portions 10 and 210 have thus far been on as shown in FIG. 4 and, at the time point that they receive the coordinated turning-off signals, the infrared communication portions 22 and 222 do not receive turning-on signals from the remote control unit 6; under these conditions, the first and third light emission portions 10 and 210 are both turned off Prior to the turning-off, as indicated by succession order (3), the first and third light emission portions 10 and 210 emit light according to the coordinated turning-off signals to relay the coordinated turning-off signals detected by the first and third light reception portions 26 and 226. These coordinated turning-off signals are each received by the adjacent second light reception portion 126. Here, the second light emission portion 110 has thus far been on as shown in FIG. 4 and, at the time point that it receives the turning-off signal, the second infrared communication portion 122 does not receive a turning-on signal from the remote control unit 6; under these conditions, the second light emission portion 110 is turned off. In this way, succeeding the turning-on of the fourth, fifth, and sixth light emission portions 310, 410, and 510 (the first part), the first, second, and third LED lighting devices 2, 4, and 40 (the second part) are turned off in a coordinated fashion. Also with such a coordinated turning-off signal, succession occurs across a plurality of paths (for example, the turning-off paths of the second light emission portion 110 in FIG. 5) like those described in connection with the coordinated general control mode shown in FIG. 3, each path functioning as a fail-safe path to the other.

The above description of FIGS. 4 and 5 assumes, for simplicity's sake, that the first and second parts are adjacent to each other, and that visible light communication takes place between mutually adjacent LED lighting devices. Coordination, however, is not limited to cases where a previously turned-on part and a newly turned-on part are adjacent to each other. In the example described above, an LED lighting device that receives a coordinated turning-off signal but that has been off is turned on momentarily for the relaying purpose. The total energy for this turning-on is so low that the human eye does not perceive it. Thus, even if an LED lighting device that is off intervenes in a path, one coordinated turning-off signal succeeds another, reaching an LED lighting device that is on to turn it off. As described in connection with the coordinated general control mode in FIG. 3, so long as sufficient light intensity can be secured within the direct and indirect illumination ranges of individual light emission portions, visible light communication is possible not only between mutually adjacent LED lighting devices but also between mutually remote LED lighting devices. Accordingly, in such a case, even if an LED lighting device that is off intervenes in its path, the coordinated turning-off signal can, directly without a relay, or skipping any relay wherever possible, reach an LED lighting device that is on to turn it off.

Figure 6:
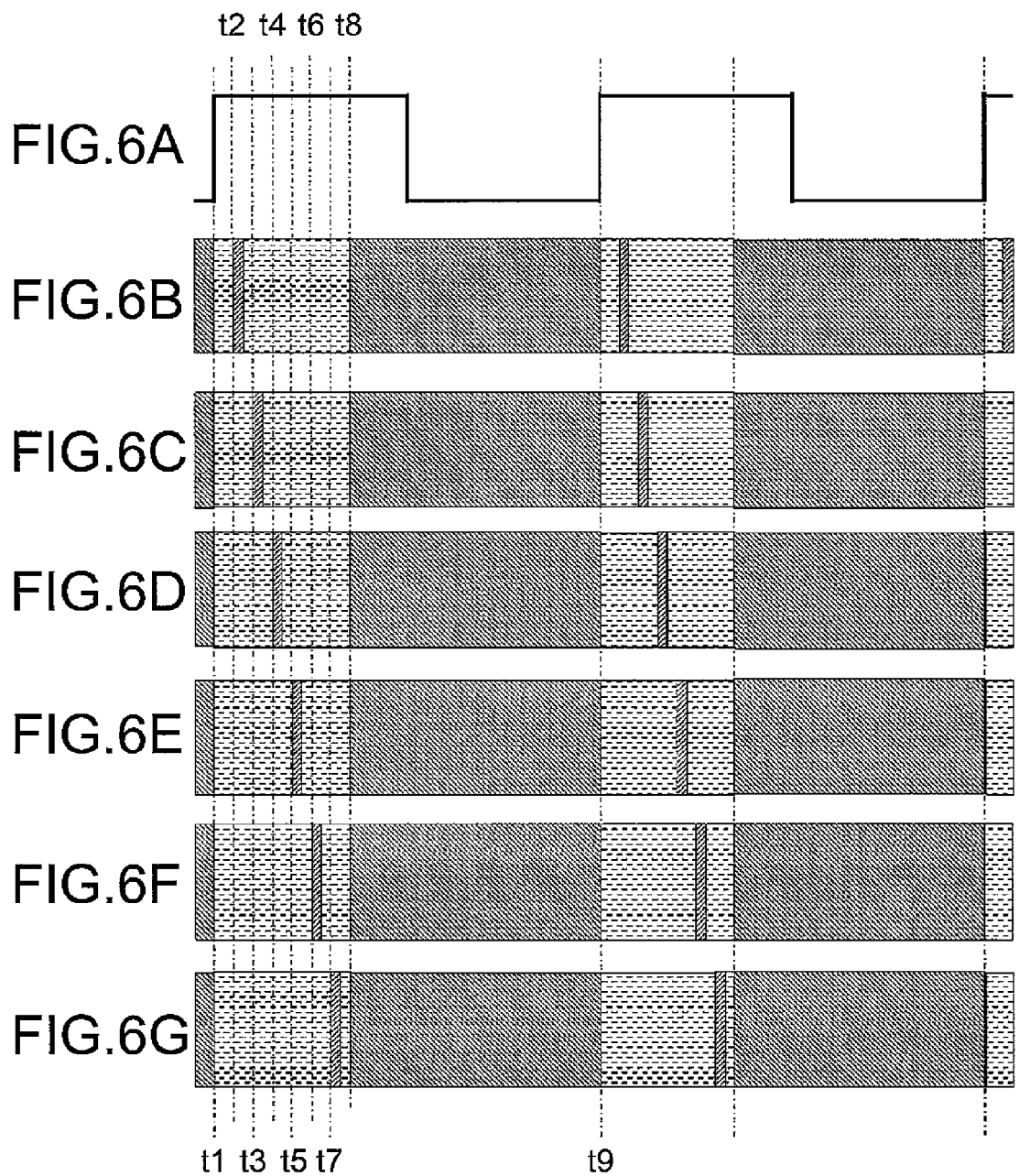
FIG. 6 is a timing chart of reciprocal visible light communication among a plurality of lighting devices.

FIG. 6 is a timing chart of reciprocal visible light communication in the first to sixth LED lighting devices 2 to 46 shown in FIGS. 2 to 5. FIG. 6(A) shows a reference timing signal which is generated from 50 Hz or 60 Hz of the alternating-current power line that feeds the individual LED lighting devices; with respect to rising edges in it as indicated by t1 and t9, the timing of visible light communication in the individual LED lighting devices is adjusted. FIG. 6 (B) to FIG. 6(G) show the transmission and reception timing allocated to the first to sixth LED lighting devices 2 to 46, respectively, with respect to the reference timing signal.

In FIG. 6, the period from t1 to t8 is allocated to communication, and the period from t8 to t9 is allocated to PWM control for dimming. That is, during the period from t8 to t9, PWM control is performed, and by varying its duty cycle, dimming is achieved. On the other hand, during the period from t1 to t8, the LED lighting devices are basically all in a non-luminous state, with their respective light reception portions at stand-by ready to receive visible light for communication from other LED lighting devices. Only during the period allocated to each LED lighting device is it turned on and off to give off visible light for communication.

Specifically, FIG. 6(B) is a timing chart of the first LED lighting device 2. The period between t2 and t3 is a transmission period during which visible light for communication can be emitted, and during this period, the other LED lighting devices are in a non-luminous state, at stand-by ready to receive visible light for communication from the first LED lighting device 2. In the periods from t1 to t2 and from t3 to t8, the first LED lighting device 2 is in a non-luminous state, at stand-by ready to receive visible light for communication from the other LED lighting devices. Likewise, FIG. 6(C) is a timing chart of the second LED lighting device 4, the period from t3 to t4 being a transmission period and the rest being a non-luminous stand-by period. FIGS. 6(D) to 6(G) are timing charts of the third to sixth LED lighting devices 40 to 46; since these can be understood in similar manners as described above, no further description will be given.

In FIG. 6 described above, for the sake of convenience of description, the period from t1 to t8 is shown exaggeratedly long; in reality, by increasing as necessary the proportion of the period from t8 to t9 in the period from t1 to t8, it is possible to increase the maximum value of the duty cycle and thereby widen the dynamic range of dimming by PWM control.

For the sake of convenience of description, the discussions thus far have been divided into those directed to the control, shown in FIG. 1, based on the detection status of infrared light 20 from the remote control unit 6 and of infrared radiation 23 and 123 from the human body and those directed to the control, shown in FIGS. 2-6, through exchange of reciprocal control information by infrared light 20 from the remote control unit 6 and by visible illumination light. In practice, those two schemes of control may be combined to realize various types of control based on detection of infrared light 20 from the remote control unit 6, detection of infrared radiation 23 and 123 from the human body, and exchange of reciprocal control information by visible illumination light.

The present invention may be implemented in any other manner than specifically described above by way of an example so long as it affords its benefits. For example, reciprocal communication for coordination among LED lighting devices is possible not only by visible light communication as used in the example described above but also by wired communication among the devices. As wired communication, it is possible to adopt power line communication across the power line that feeds electric power to the power supply portions of the individual LED lighting devices.

Figure 7:
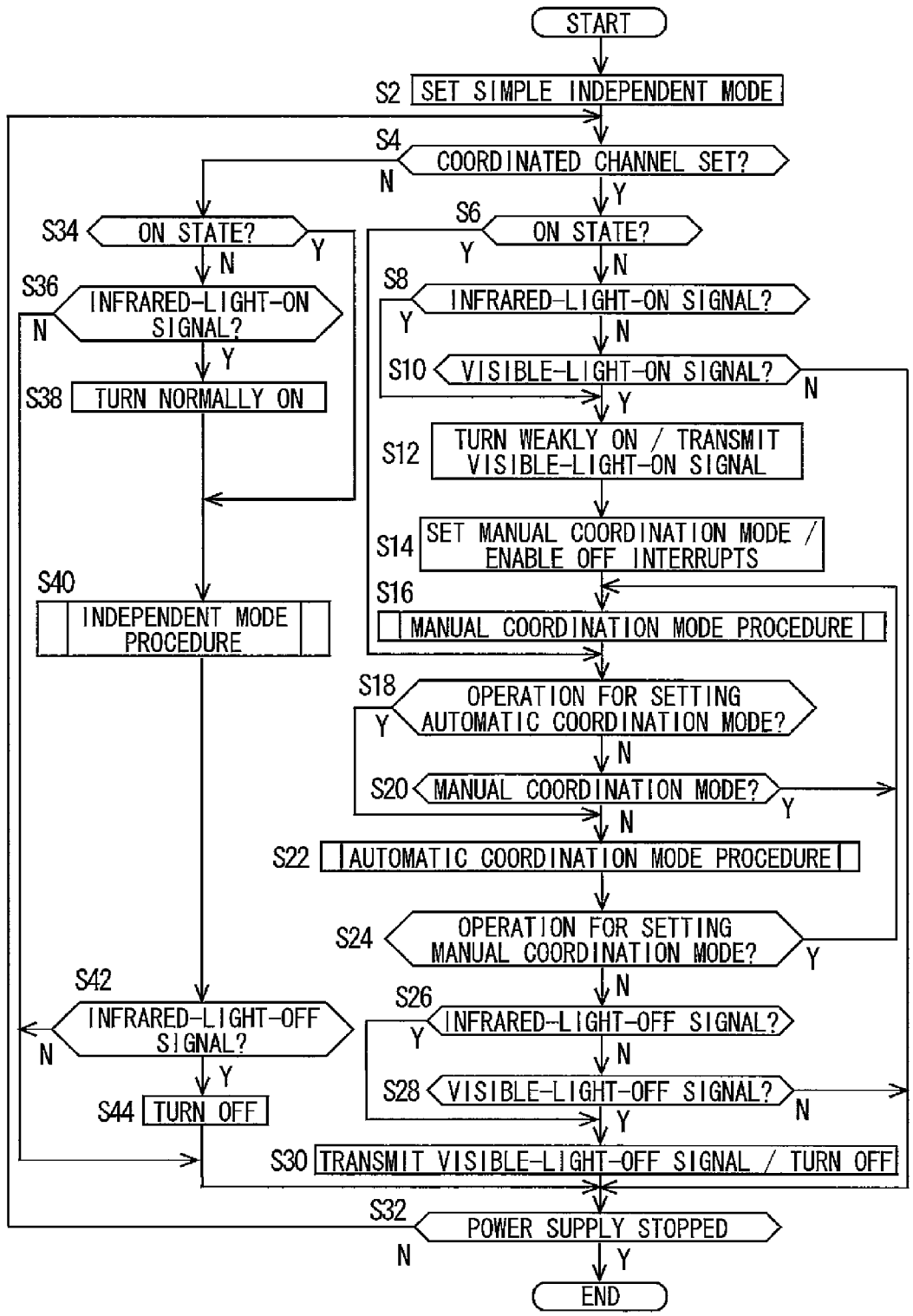
FIG. 7 is a basic flow chart showing the operation of a lighting control portion in the example of the invention shown in FIG. 1.

FIG. 7 is a basic flow chart showing the operation of the first or second illumination control portion 14 or 114 in the example of the invention shown in FIG. 1. The flow starts when the first or second illumination control portion 14 or 114 is connected to the power source. In the following description, to avoid complexity, the flow will be discussed as the function of the first illumination control portion 14 of the first LED lighting device 2 as the representative of its kind. Similar is the function, it is to be noted, of the second illumination control portion 114 of the second LED lighting device 4 and of, though not illustrated, the infrared communication portions of the third, fourth, fifth, and sixth lighting devices 40, 42, 44, and 46 respectively.

Also discussed with reference to FIG. 7 will be the human-detecting partial lighting mode which involves coordination with the human detection sensors—the mode of which description has been omitted with respect to FIGS. 2 to 5. As discussed in connection with FIG. 1, in the human-detecting partial lighting mode, the first illumination control portion 14 turns on or off the first light emission portion 10 according to the detection status of the first infrared communication portion 22, which receives infrared light 20 from the remote control unit 6, and of the first human detection sensor 24, which detects infrared radiation 23 from the human body. Moreover, according to the specific functions in the human-detecting partial lighting mode that proceed along the flows in FIG. 7 and the following figures, the first illumination control portion 14 coordinates with the LED lighting devices around it (for example, the second LED lighting device 4) in such a way as to turn on an LED lighting device for which detection by a human detection sensor is present and in addition turn weakly on the LED lighting devices around it; thus, care is taken so that, as a person moves, the LED lighting device that is turned on changes smoothly. How this is achieved will now be described in detail with reference to the flow charts.

First, along the flow in FIG. 7, the control functions will be described in detail. When the flow starts, first, at step S2, the simple independent mode is set as the initial mode, and an advance is made to step S4. At Step S4, it is checked whether or not a coordinated channel (see the description of FIG. 3) set to be common to all the LED lighting devices is set. If it is set, an advance is made to step S6, where it is checked whether or not the first LED lighting device 2 is in the on state. If it is not in the on state, an advance is made to step S8, where it is checked whether or not the first LED lighting device 2 has received an infrared-light-on signal from the remote control unit 6. If no infrared-light-on signal has been received, an advance is made to step S10, where it is checked whether or not a visible-light-on signal has been received from another lighting device such as the second LED lighting device 4.

If, at step S10, a visible-light-on signal has been received, an advance is made to step S12. Also if, at step S8, it is detected that the first LED lighting device 2 has received an infrared-light-on signal from the remote control unit 6, an advance is made to step S12. At step S12, first, the first light emission portion 10 itself is turned weakly on, and then, for the coordinated partial lighting mode with LED lighting devices, a visible-light-on signal is transmitted via the coordinated channel for visible light. Here, the purpose of first turning the first light emission portion 10 itself weakly on is that, depending on the detection status of the human detection sensor, there may be a case where the first light emission portion 10 is not turned on; whether to turn it on or not will be determined at a later step. Furthermore, at step S14, first a manual coordination mode is set as the initial mode, and then, so that on receipt of an infrared-light-off signal from the remote control unit 6 or a visible-light-off signal from an adjacent LED lighting device during the later-described manual coordination mode procedure an interrupt can be generated to make a jump to the later-described procedure for turning off at step S30, interrupts in response to such signals are enabled.

Thereafter, an advance is made to step S16, where the manual coordinated mode procedure is executed. The manual coordinated mode procedure at step S16 is a procedure whereby, each time the remote control unit 6 is operated manually, the movement of a person is followed through detection by human detection sensors and the lighting state of LED lighting devices is so changed as to produce illumination predominantly around where the person is. In the later-described automatic coordinated mode procedure, no such manual operation is involved, and the movement of a person is followed so as to automatically change the lighting state of LED lighting devices. The purpose of first setting the manual coordination mode as the initial mode at step S14 is as follows: if immediately after generation of an on signal the automatic coordination mode procedure functions to suddenly cause lighting changing control as described above, it may surprise people who do not know the function of the lighting devices or, depending on the situation, may result in unintended control. By adopting the manual coordination mode as the initial mode after generation of an on signal, it is possible to put in effect a mode where the lighting state is not changed unless a person makes a manual operation.

In the manual coordination mode procedure at step S16, for a predetermined short period, a series of checks are made and based on the results the lighting state is changed as necessary; the procedure is then ended. Then, to cope with a mode setting change, an advance is made to step S18. Incidentally, if, at step S6, it is detected that the first light emission portion 10 is in the on state, the flow advances directly to step S18. At step S18, it is checked whether or not an operation for setting the automatic coordination mode has been made. If no such operation has been made, an advance is made to step S20, where it is checked whether or not the current mode is the manual coordination mode. If it is not the manual coordination mode, then it is the automatic coordination mode, and accordingly an advance is made to the automatic coordination mode procedure at step S22. Also if, at step S18, an operation for setting the automatic coordination mode is detected, an advance is made to step S22. On the other hand, if, at step S20, the manual coordination mode is detected, the flow returns to step S16, and thereafter, unless an operation for a setting change is detected at step S18, the loop from step S16 through step S20 is repeated to continue the manual coordination mode procedure.

At step S22, the automatic coordination mode procedure is executed. As mentioned above, the automatic coordination mode procedure at step S22 is a procedure that, without waiting for a manual operation, follows the movement of a person by human detection sensors and continues changing the lighting state of LED lighting devices automatically in such a way that illumination is provided predominantly around where the person is. Also in the automatic coordination mode at step S22, for a predetermined short period, a series of checks are made and based on the results the lighting state is changed as necessary; the procedure is then ended. Then, to cope with a mode setting change, an advance is made to step S24. Step S22 will be described in detail later. At step S24, it is checked whether or not an operation for setting the manual coordination mode has been made and, if no such operation has been made, an advance is made to step S26. On the other hand, if, at step S24, an operation for setting the manual coordination mode is detected, the flow returns to step S16, and thereafter, unless an operation to restore the setting for the automatic coordination mode is detected, an entry is made into the loop from step S16 through step S20, and the loop is repeated to continue to the manual coordination mode.

At step S26, it is checked whether or not the first LED lighting device 2 has received an infrared-light-off signal from the remote control unit 6. If no infrared-light-off signal has been received, an advance is made to step S28, where it is checked whether or not a visible-light-off signal has been received from another lighting device such as the second LED lighting device 4. If, at step S28, a visible-light-off signal has been received, an advance is made to step S30. Also if, at step S26, it is detected that the first LED lighting device 2 has received an infrared-light-off signal from the remote control unit 6, an advance is made to step S30. At step S30, for the coordinated partial control mode with LED lighting devices, an off-state signal is transmitted via the coordinated channel for visible light; thereafter, the first light emission portion 10 is turned off, and an advance is made to step S32. If, at step S10, no visible-light-on signal has been received or, at step S28, no visible-light-off signal has been received, a direct advance is made to step S32.

At step S32, it is checked whether or not the supply of electric power to the first illumination control portion 14 is stopped. If the supply of electric power is not stopped, the flow returns to step S4, and thereafter, if a coordinated channel has been set, steps S4 through S32 are repeated to perform control to cope with changes in situation. If, at step S24, no operation for setting the manual coordination mode is detected, an advance is made to step S26 and the following steps. By contrast, if no off signal is received and in addition the supply of electric power is not stopped, then, so long as the automatic coordination mode and the on state are in effect, the flow, by proceeding from step S32 through steps S4, S6, and S18, quickly returns to step S22, where the automatic coordination mode is continued. On the other hand, if, at step S32, the supply of electric power is found to be stopped, the entire flow is ended.

Incidentally, if, at step S4, no coordinated channel is set, the mode in effect is one where the individual LED lighting devices are controlled independently of one another via channels dedicated to them respectively. To execute that, an advance is made to step S34, where it is checked whether or not the first LED lighting device 2 is in the on state. If it is not in the on state, an advance is made to step S24, where it is checked whether or not the first LED lighting device 2 has received an infrared-light-on signal from the remote control unit 6. If an infrared-light-on signal is detected to have been received, an advance is made to step S38, where the first light emission portion 10 is turned on, and an advance is made to the independent mode procedure at step S40. If, at S34, the first light emission portion 10 is detected to be in the on state, a direct jump is made to step S40.

The independent mode procedure at step S40 is for performing control, such as dimming among others, individually for the first LED lighting device 2 via the channel dedicated to it or in a coordinated fashion with other LED lighting devices controlled via other channels dedicated to them. Moreover, in the independent mode procedure at step S40, for a predetermined short period, a series of checks are made and control based on the results is performed; then the procedure is ended. Then, to cope with an infrared-light-off signal, an advance is made to step S42. At step S42, it is checked whether or not the first LED lighting device 2 has received an infrared-light-off signal from the 6, and if it is detected to have been received then, at step S44, the first LED lighting device 2 is turned off, and an advance is made to step S32. On the other hand, if, at step S36, no infrared-light-on signal is detected, a direct advance is made to step S32. The functions at step S32 and the following steps are as already described; if the supply of electric power is not detected to be stopped, the flow returns to step S4, and thereafter, unless a coordinated channel is set, the loop from step S4 through step S34 to step S32 is repeated to cope with operations for turning on, turning off, dimming, and otherwise controlling the first LED lighting device 2.

Figure 8:
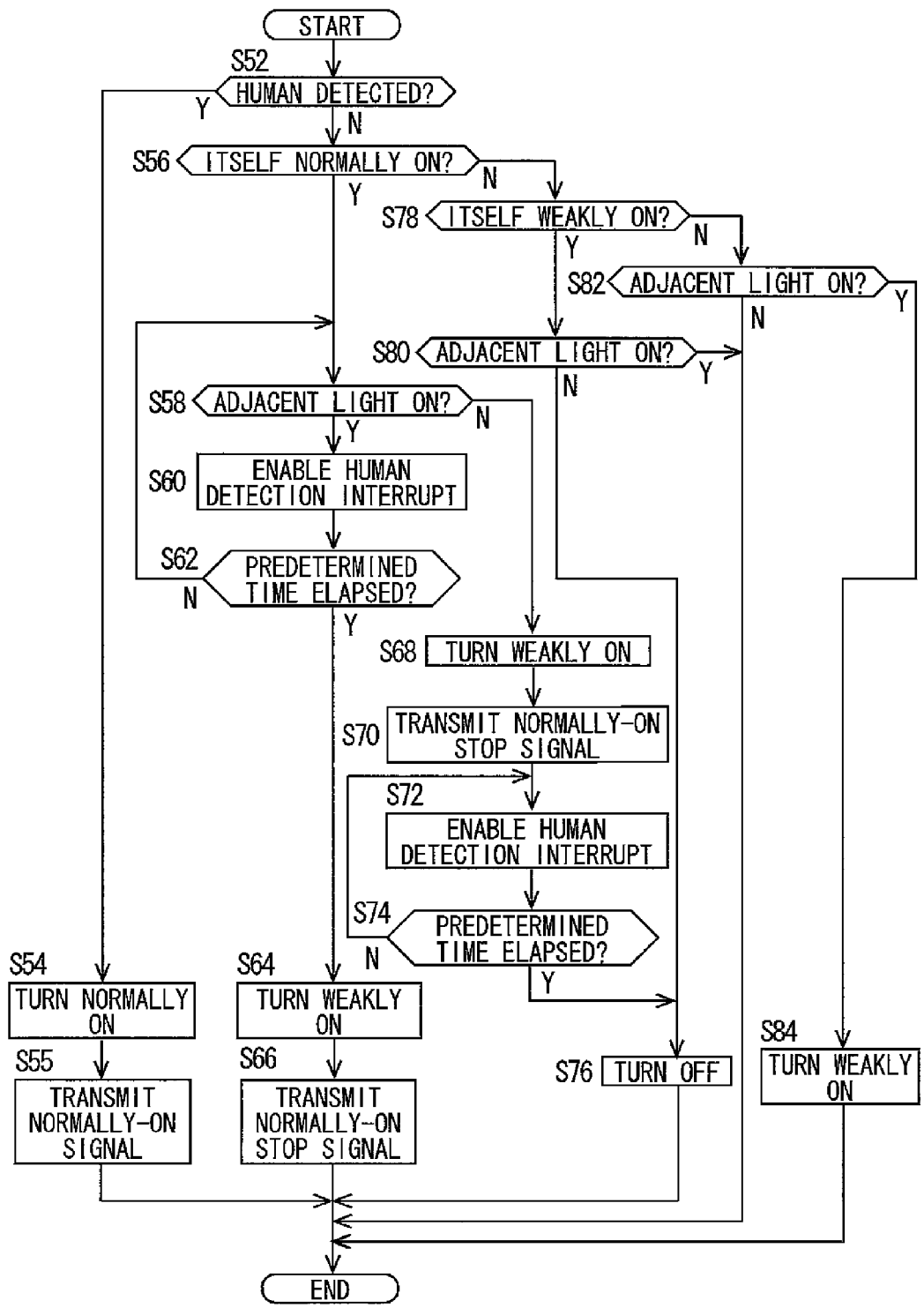
FIG. 8 is a flow chart showing the details of step S22 in FIG. 7.

FIG. 8 is a flow chart showing the details of the automatic coordination mode procedure at step S22 in FIG. 7. When the flow starts, at step S52, it is checked whether or not the first human detection sensor 24 is in a state of detecting a human. If human detection is present, an advance is made to step S54, where the first light emission portion 10 is turned normally on. Next, an advance is made to step S55, where, for automatic coordination, by visible light communication via the coordinated channel, a signal indicating that the first LED lighting device 2 is normally on is transmitted to any adjacent LED lighting device, then the procedure is ended.

On the other hand, if, at step S52, no human detection by the first human detection sensor 24 is confirmed, an advance is made to step S56. This state is not always one where human detection is absent from the beginning, but also may be one at the moment that a person has just moved away such that previously present human detection is now absent. At step S56, it is checked whether or not the first light emission portion 10 is currently normally on, and if it is normally on, an advance is made to step S58, where it is checked whether or not any adjacent LED lighting device is normally on. This check is achieved by receiving a normally-on signal from the adjacent lighting device. If the adjacent LED lighting device is in the normally on state, an advance is made to step S60, where human detection-induced interrupts are enabled, and an advance is made to step S62, where it is checked whether or not a predetermined time has elapsed since human detection became absent. If the predetermined time has not elapsed, a return is made to step S58, and thereafter, until the predetermined time elapses, steps S58 through S62 are repeated to keep the first light emission portion 10 normally on. Meanwhile, whenever human detection by the first human detection sensor 24 recurs, an interrupt permits an immediate advance to step S52.

The continuation of normal lighting through repetition of step S58 through S62 mentioned above is intended to cope with situations where, for example, a person moves into the vicinity of the adjacent LED lighting device and immediately moves back into the vicinity of the first LED lighting device 2, that is, to prevent the lighting state from changing restlessly. After the lapse of the predetermined time at step S62, an advance is made to step S64, where the lighting state is changed to weak lighting. Then, at step S66, a signal indicating that normal lighting has been stopped is transmitted to the adjacent lighting device, and the flow is ended.

On the other hand, if, at step S58, it is not detected that the adjacent LED lighting device is normally on, an advance is made to step S68, where immediately the lighting state is changed to weak lighting, and then, at step S70, a signal indicating that normal lighting has been stopped is transmitted to the adjacent lighting device. Then, at step S72, human detection-induced interrupts are enabled, and an advance is made to step S74, where it is checked whether or not a predetermined time has elapsed since human detection became absent. If the predetermined time has not elapsed, a return is made to step S72, and thereafter, until the predetermined time elapses, steps S72 and S74 are repeated to keep the first light emission portion 10 weakly on. Meanwhile, whenever human detection by the first human detection sensor 24 recurs, an interrupt permits an immediate advance to step S52. Also when the adjacent lighting device has changed its lighting state according to a change in the output of its human detection sensor, an interrupt permits an advance to whichever is appropriate of steps S58, S80, and S82, of which the last two will be described later.

The continuation of weak lighting through repetition of steps S72 through S74 mentioned above is intended to cope with situations where, for example, a person moves away from the first LED lighting device 2 and immediately moves back, that is, to prevent the lighting state from changing extremely restlessly between on and off After the elapse of the predetermined time at step S74, an advance is made to step S76, where the first light emission portion 10 is turned off and the flow is ended.

By contrast, if, at step S56, while no human detection is present, the first light emission portion 10 is not detected to be normally on, an advance is made to step S78, where it is checked whether or not the first light emission portion 10 is weakly on. If it is weakly on, an advance is made to step S80. This state corresponds to one where, while no human detection by the first human detection sensor 24 is present, the turning on of the adjacent LED lighting device has preliminarily caused weak lighting. At step S80, it is checked whether or not the adjacent LED lighting device is normally lit. When it stops being on, an advance is made to step S76, where the first light emission portion 10 is turned off, and the flow is ended. On the other hand, if, at step S80, it is confirmed that the adjacent LED lighting device is normally on, the flow is immediately ended. In this case, the preliminary weak lighting of the first light emission portion 10 is continued.

On the other hand, if, at step S78, the first light emission portion 10 is not detected to be weakly on, an advance is made to step S82, where it is checked whether or not the adjacent LED lighting device is normally on. When the lighting state of the adjacent LED lighting device changes to normal lighting, an advance is made to step S84, where weak lighting of the first light emission portion 10 is started, and the flow is ended. On the other hand, if, at step S82, the adjacent LED lighting device is not detected to be normally on, the flow is immediately ended. In this case, the off state of the first light emission portion 10 is continued.

Now, a supplementary description will be given of the mode change between the automatic coordination mode and the manual coordination mode. In the example described above, to prevent confusion about the mode, a mode change between the automatic and manual coordination modes is performed in a unified manner with all the LED lighting devices that are present in a room. And such a mode change is basically effected by infrared light communication based on operation of the remote control unit 6. However, with an LED lighting device located so far away from the remote control unit 6 that infrared light does not reach it, the mode change may not take place. To cope with such a situation, in the example described above, a mode change signal by infrared light is forwarded by visible light communication among LED lighting devices so that the mode change reliably takes place with an LED lighting device located outside the infrared light communication range of the remote control unit 6.

Specifically, the detection of an operation for setting the automatic coordination mode at step S18 in FIG. 7 and the detection of an operation for setting the manual coordination mode at step S24 are achieved basically by reception of infrared light 20 transmitted in a unified manner with all the LED lighting devices based on operation of the remote control unit 6. Here, to ensure that a mode change between the automatic and manual coordination modes takes place also with an LED lighting device located outside the reachable range of the infrared light 20, an LED lighting device that has received infrared light 20 for a mode change then transmits by visible light communication a mode change signal to the adjacent LED lighting device, and this mode change signal is forwarded from one LED lighting device to any adjacent to it. Thus, it is assumed that the detection of an operation for setting the automatic coordination mode at step S18 in FIG. 7 and the detection of an operation for setting the manual coordination mode at step S24 include detection by visible light communication. To realize this function, though omitted from illustration in FIG. 7, there is inserted, on the way of the advance from step S18 to step S22, a step of "automatic coordination mode setting visible signal transmission," and there is inserted, on the way of the return from step S24 to step S16, a step of "manual coordination mode setting visible signal transmission."

Figure 9:
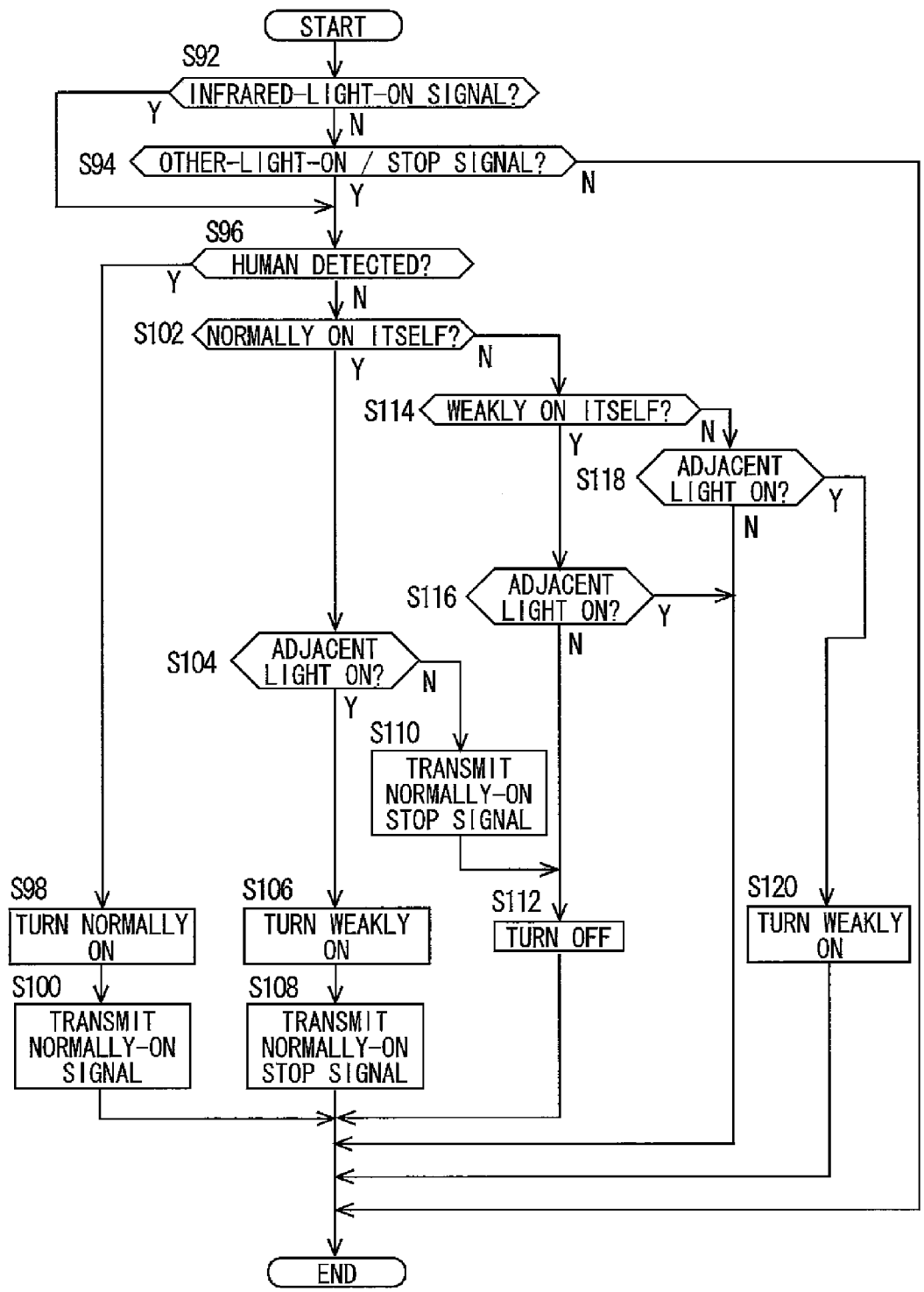
FIG. 9 is a flow chart showing the details of step S16 in FIG. 7.

FIG. 9 is a flow chart showing the details of the manual coordination mode procedure at step S16 in FIG. 7. When the flow starts, at step S92, it is checked whether or not an infrared-on signal based on operation of the remote control unit 6 has been received. Here, the operation of the remote control unit 6 is that performed according to the intention of a person who, holding the remote control unit 6, moves and wants whichever LED lighting device is located near him to be turned on as he moves. This operation may be of the type dedicated to changing the lighting state, but considering that redoing a lighting operation would be more natural, the example adopts a configuration that detects an ordinary infrared-on signal.

If, at step S92, no infrared-on signal is detected, an advance is made to step S94, where it is checked whether or not there has been a change in another LED lighting device from the normally on state to discontinuation of that state. This check is achieved by detection of a visible light signal forwarded from the adjacent LED lighting device. Step S94 is intended to enable the first LED lighting device 2, even when infrared light from the remote control unit 6 does not reach it, to detect operation of the remote control unit 6 by signal forwarding based on infrared light detected by another LED lighting device. If, at step S94, a state change in another LED lighting device is detected, an advance is made to step S96. Also if, at step S92, an infrared-on signal is directly detected, an advance is made to step S96.

At step S96, it is checked whether or not, at the time point that the remote control unit 6 is operated, the first human detection sensor 24 is detecting a human, and if human detection is present, an advance is made to step S98, where the first light emission portion 10 is turned normally on. Next, an advance is made to step S100, where, for manual coordination, by visible light communication via the coordinated channel, a signal indicating that the first LED lighting device 2 is normally on is transmitted to the adjacent LED lighting device, and the flow is ended.

By contrast, if, at step S96, no human detection by the first human detection sensor 24 is confirmed, an advance is made to step S102. At step S102, it is checked whether or not, at the time point that the remote control unit 6 is operated, the first light emission portion 10 is normally on, and if it is normally on, an advance is made to step S104, where it is checked whether or not the adjacent LED lighting device is normally on. This check is achieved by receiving a normally-on signal from the adjacent LED lighting device. If the adjacent LED lighting device is in the normally on state, an advance is made to step S106, where the lighting state is changed to weak lighting. Then, at step S108, a signal indicating that normal lighting has been stopped is transmitted to the adjacent LED lighting device, and the flow is ended.

On the other hand, if, at step S104, it is not detected that the adjacent LED lighting device is normally on, then, at step S110, a signal indicating that normal lighting has been stopped is transmitted to the adjacent LED lighting device, and then an advance is made to step S112, where the first light emission portion 10 is turned off, and the flow is ended. In this way, in the manual coordination mode, when no detection by the first human detection sensor 24 is present and in addition the adjacent LED lighting device is not in the on state, the first light emission portion 10 is immediately turned off. This is because, considering that a change in the lighting state is effected by manual operation of the remote control unit 6 according to human intention, it is appropriate to change the lighting state immediately according to the situation.

By contrast, if, at step S102, while no human detection is present, it is not detected that the first light emission portion 10 is normally on, an advance is made to step S114, where it is checked whether or not the first light emission portion 10 is weakly on. If it is weakly on, an advance is made to step S116. This state corresponds to one where, while no detection by the first human detection sensor 24 is present, the turning on of the adjacent LED lighting device has caused weak lighting. At step S116, it is checked whether or not the adjacent LED lighting device is normally on. If it is not normally on, an advance is made to step S112, where the first light emission portion 10 is turned off, and the flow is ended. On the other hand, if, at step S116, it is confirmed that the adjacent LED lighting device is normally on, the flow is immediately ended. In this case, weak lighting of the first light emission portion 10 is continued.

On the other hand, if, at step S114, it is detected that the first light emission portion 10 is weakly on, an advance is made to step S118, where it is checked whether or not the adjacent LED lighting device is normally on. When the lighting state of the adjacent LED lighting device changes to normal lighting, an advance is made to step S120, where weak lighting of the first light emission portion 10 is started, and the flow is ended. On the other hand, if, at step S118, it is not confirmed that the adjacent LED lighting device is normally on, the flow is immediately ended. In this case, the off state of the first light emission portion 10 is continued.

Figure 10:
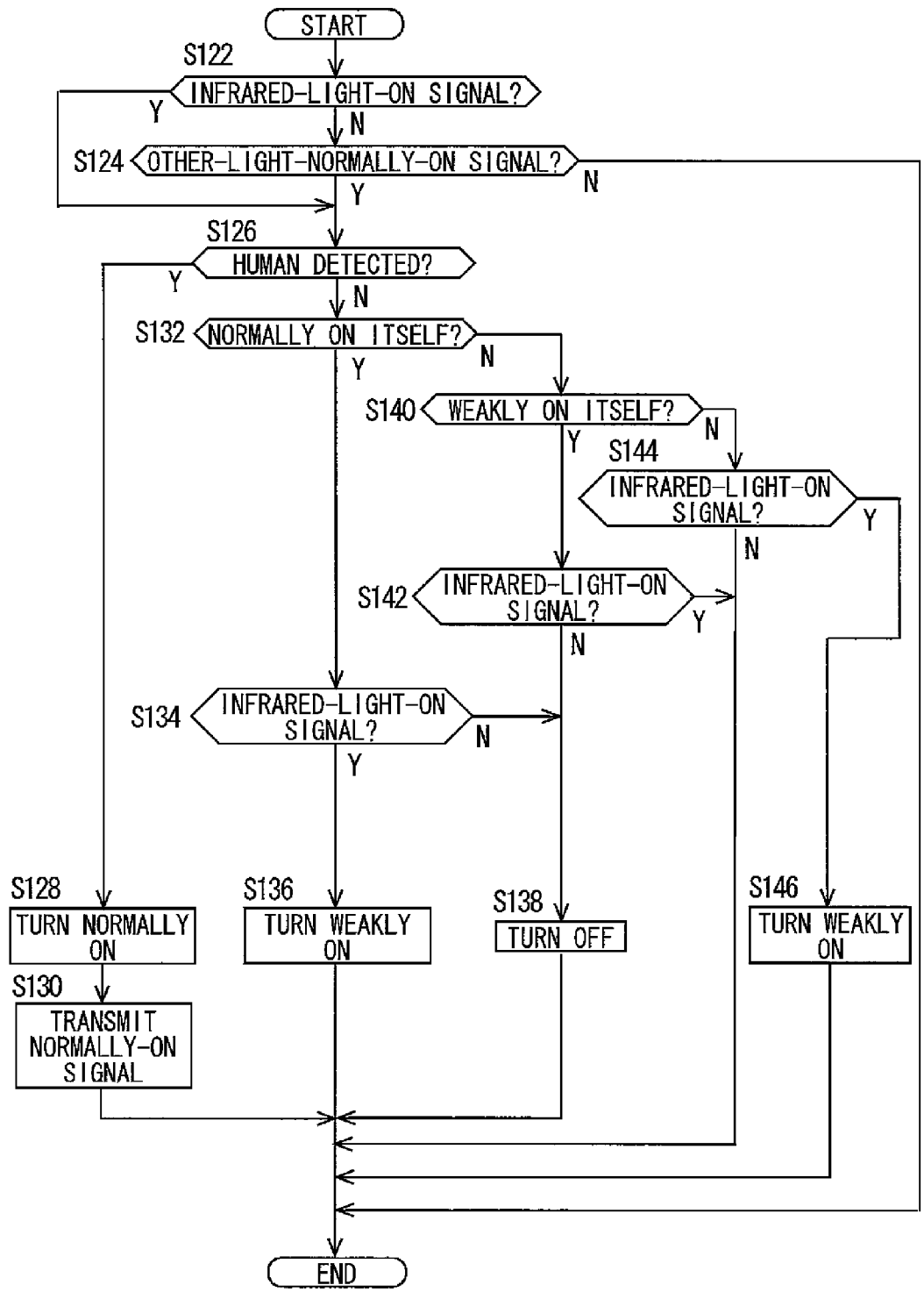
FIG. 10 is a flow chart showing a modified example of the details of step S16 in FIG. 7.

FIG. 10 is a flow chart showing a modified example of the details of the manual coordination mode procedure at step S16 in FIG. 7. The manual coordination mode procedure shown in FIG. 9 is so configured as to control the first light emission portion 10 based on the combination of the detection status of the first human detection sensor 24 at the time of operation of the remote control unit 6 and the lighting state of the adjacent LED lighting device. By contrast, the modified example of the manual coordination mode procedure shown in FIG. 10 uses as information the communication range of the infrared light 20 at the time of operation of the remote control unit 6, and is so configured as to control the first light emission portion 10 based on the combination of the detection state of the first human detection sensor 24 at the time of operation of the remote control unit 6 and the reception status of an infrared-on signal in the first infrared communication portion 22.

When the flow in FIG. 10 starts, as in FIG. 9, first, at step S122, it is checked whether or not an infrared-on signal based on operation of the remote control unit 6 has been received. If, at step S122, no infrared-on signal is detected, an advance is made to step S124, where it is checked whether or not a signal has been forwarded from another LED lighting device indicating that it has entered the normally on state. This check is intended to cope with a lighting status change in a case where the remote control unit 6 is operated at a location from where the infrared-on signal does not reach the first infrared communication portion 22, and, as will be described later, serves to realize a lighting state of the first light emission portion 10 coordinated with another LED lighting device having entered the normally on state by human detection. If, at step S124, another LED lighting device is detected to be normally on, an advance is made to step S126. Also if, at step S122, an infrared-on signal is directly detected, an advance is made to step S126.

At step S126, it is checked whether or not the first human detection sensor 24 is detecting a human at the time that the remote control unit 6 is operated, and if human detection is present, an advance is made to step S128, where the first light emission portion 10 is turned normally on. Next, an advance is made to step S130, where, for manual coordination, by visible light communication via the coordinated channel, a signal indicating that the first LED lighting device 2 is normally on is transmitted to the adjacent LED lighting device, and the flow is ended. Step S130 permits the fact that the first LED lighting device 2 has entered the on state to be forwarded from one device to another to be communicated to an LED lighting device located outside the infrared communication range of the remote control unit 6.

On the other hand, if, at step S126, no human detection by the first human detection sensor 24 is confirmed, an advance is made to step S132. At step S132, it is checked whether or not the first light emission portion 10 is normally on at the time point that the remote control unit 6 is operated, and if it is normally on, an advance is made to step S134, where it is checked whether or not the advance from step S126 to step S132 has resulted from an infrared-on signal. If it has been resulted from an infrared-on signal, that means that the first LED lighting device 2 is located within the infrared communication range of the remote control unit 6, and thus, although no detection by the first human detection sensor 24 is present, assuming that the first LED lighting device 2 is located in the vicinity of an LED lighting device in the on state, at step S136, the first light emission portion 10 is turned weakly on, and the flow is ended.

On the other hand, if, at step S134, it is not detected that the advance from step S126 to step S132 has resulted from an infrared-on signal, that means that the first LED lighting device 2 is located outside the infrared communication range of the remote control unit 6, and thus, unless detection by the first human detection sensor 24 is present, assuming that no LED lighting device is located in the vicinity of the first LED lighting device 2, at step S138, the first light emission portion 10 is turned off, and the flow is ended.

By contrast, if, at step S132, while no human detection is present, it is not detected that the first light emission portion 10 is normally on, an advance is made to step S140, where it is checked whether or not the first light emission portion 10 is weakly on. If it is weakly on, an advance is made to step S142, where it is checked whether or not the advance from step S126 to step S140 has resulted from an infrared-on signal. If, at step S142, the checked condition is not detected to be met, that means that the first LED lighting device 2 is located outside the infrared communication range of the remote control unit 6, and thus, at step S138, the first light emission portion 10 is turned off, and the flow is ended.

On the other hand, if, at step S142, it is detected that the advance from the step S126 to step S140 has resulted from an infrared-on signal, the flow is immediately ended. In this case, weak lighting of the first light emission portion 10 is continued. This is because, in a case where the advance from the step S126 to step S140 has resulted from an infrared-on signal, that means that the first LED lighting device 2 is located within the infrared communication range of the remote control unit 6. In this case, although no detection by the first human detection sensor 24 is present, assuming that the first LED lighting device 2 is located in the vicinity of an LED lighting device in the on state, weak lighting of the first light emission portion 10 is continued as mentioned above.

If, at step S140, it is not detected that the first light emission portion 10 is weakly on, an advance is made to step S144, where it is checked whether or not the advance from step S126 to step S140 has resulted from an infrared-on signal. If the checked condition is met, an advance is made to step S146, where weak lighting of the first light emission portion 10 is started, and the flow is ended. This is because, in that case, although no detection by the first human detection sensor 24 is present, the first LED lighting device 2 may be located in the vicinity of an LED lighting device in the on state. On the other hand, if, at step S144, the checked condition is not detected to be met, the flow is immediately ended. In this case, the off state of the first light emission portion 10 is continued.

The various technical features disclosed in the present description will be presented below in a comprehensive fashion.

<First Technical Feature>

The first technical feature disclosed in the present description provides a lighting device having: a light emission portion; a first reception portion that can receive a first control signal from a portable external remote control unit; a second reception portion that can receive a second control signal from an external lighting device; and a control portion that can control the light emission portion based on signals received by the first and second reception portions. This makes possible illumination coordinated among lighting devices. According to a specific feature, the second control signal is a signal that turns on the light emission portion or a signal that turns off the light emission portion.

According to another specific feature, the control portion controls the light emission portion based on the signal reception state of, and the content received by, the first and second reception portions. This makes possible various types of coordination according to, for example, the receivability of the first control signal depending on the location of the remote control unit, or the status of the external lighting device.

According to another specific feature, the control portion turns off the light emission portion when, while the first reception portion is receiving no signal, the second reception portion receives the second control signal. This makes it possible, even when the lighting device is located outside the reception range of the first control signal depending on the location of the remote control unit, to prevent unnecessary lighting and turn off the light emission portion.

According to another specific feature, the control portion controls the light emission portion by either of the first and second control signals. This makes it possible, even when the lighting device is located outside the reception range of the first control signal depending on the location of the remote control unit, to turn on or off the light emission portion in a coordinated fashion with the external lighting device.

According to another specific feature, the control portion gives priority to the first control signal when the first and second control signals are both received and are different from each other. This makes it possible, when the lighting device is located within the reception range of the first control signal depending on the location of the remote control unit, to perform control with priority given to the first control signal so as to realize control without confusion always with priority given to the control of a lighting device located near the remote control unit, with a remotely located lighting device coordinated with it.

According to another specific feature, the control portion commands forwarding of the second control signal to the external lighting device. Thus, the lighting device can control its own turning on and off and also control, in a coordinated fashion, the external lighting device. According to a more specific feature, when the first control signal is a signal that turns off the light emission portion, the control portion forwards as the second control signal a signal that turns off the light emission portion to the external lighting device. On the other hand, when the first control signal is a signal that turns on the light emission portion, the control portion commands forwarding of, as the second control signal a signal that turns on the light emission portion to the external lighting device.

According to another more specific feature, when the first control signal from the remote control unit is a signal that turns on the light emission portion, the control portion commands forwarding of, as the second control signal, a signal that turns off the external lighting device. Thus, when a lighting device near the remote control unit is turned on, a remote external lighting device located outside the reception range of the remote control unit can be turned off in a coordinated fashion, and thus the lighting devices can be controlled appropriately according to the location of the remote control unit.

According to another more specific feature, in response to receipt by the second reception portion of the second control signal, the control portion commands its forwarding to the external lighting device. Thus, coordination can be made to take place in succession. For example, a large number of lighting devices arranged over a large area can be coordinated in a successive fashion.

According to another specific feature, the second control signal is transferred from the external lighting device on a wireless basis. According to a still more specific feature, the second control signal is contained in the illumination light of the external lighting device. According to a more specific feature, the control portion controls the light emission portion to transfer the second control signal to the external lighting device.

According to another more specific feature, the second control signal is transferred from the external lighting device on a wired basis. According to a more specific feature, the second control signal is transferred from the external lighting device by power line communication.

<Second Technical Feature>

The second technical feature disclosed in the present specification provides a lighting device having: a light emission portion; a human detection sensor; a reception portion that receives information from an adjacent lighting device; and a control portion that controls the lighting state of the light emission portion according to the human detection sensor and the information received by the reception portion. This makes possible control based on the human detection sensor and coordinated with the adjacent lighting device.

According to a specific feature, while no human detection by the human detection sensor is present, when the reception portion receives information to the effect that the adjacent lighting device has been turned on, the control portion makes the light emission portion emit light preliminarily. This makes possible smooth lighting control according to human movement detected by the human detection sensor.

According to a more specific feature, the above-mentioned preliminary light emission is light emission with weaker light than in the normally on state. Thus, in a state where the adjacent lighting device is on, it is possible to prepare for future turning on expected to be triggered by the human detection sensor.

According to another specific feature, while the light emission portion is emitting light, when human detection by the human detection sensor becomes absent, if the reception portion is receiving information to the effect that the adjacent lighting device is on, the control portion makes the light emission portion continue light emission. Thus, it is possible to cope with situations where, for example, a person moves into the vicinity of the adjacent lighting device and immediately returns, that is, to prevent such a momentary human movement from causing the lighting state to change restlessly.

According to a more specific feature, during the above-mentioned continuation of light emission by the light emission portion, when no human detection by the human detection sensor is present for a predetermined time or longer, the control portion stops the continued light emission by the light emission portion. Thus, it is possible to realize reasonable continuation of light emission by the light emission portion.

According to a more specific feature, in the above-described configuration, the control portion stops continuation of light emission by the light emission portion in the normally on state and switches it to light emission with weaker light than in the normally on state. This makes smoother lighting control possible.

According to another specific feature, during light emission by the light emission portion, when human detection by the human detection sensor becomes absent, the control portion switches to light emission with weaker light than in normally on state. This make it possible to more smoothly cope with a change in situation thereafter.

According to a more specific feature, during light emission by the light emission portion, when human detection by the human detection sensor becomes absent, if the reception portion does not receive information to the effect that the adjacent lighting device is on, the control portion effects the above-mentioned switch to light emission with weaker light than in normally on state. Through coordination with the adjacent lighting device, it is possible to more appropriately control light emission with weak light.

According to a more specific feature, when there is no human detection by the human detection sensor for a predetermined time or longer, the control portion stops the above-mentioned continuation of light emission with weaker light than in the normally on state. This makes it possible to reasonably realize continuation of light emission by the light emission portion with weak light.

According to another feature, a lighting device is provided that has: a light emission portion; a reception portion that receives information from an adjacent lighting device; and a control portion that makes the light emission portion emit light according to the information received by the reception portion. This makes possible effective coordination with the adjacent lighting device. According to a specific feature, according to the information received by the reception portion, the control portion makes the light emission portion emit light with weaker light than in the normally on state.

<Third Technical Feature>

The third technical feature disclosed in the present specification provides a lighting device having: a light emission portion; a human detection sensor; a control signal reception portion that receives a control signal; and a control portion that controls the lighting state of the light emission portion based on the human detection state of the human detection sensor at the time point that the control signal reception portion receives the control signal.

Thus, each time a control signal is received, according to the human detection state, refreshing to an appropriate lighting state is effected. According to a specific feature, until the control signal reception portion newly receives a control signal, the control portion maintains the previous control state.

According to another specific feature, the control signal reception portion receives a control signal from an external remote control unit. Thus, by remote control operation, refreshing to an appropriate lighting state is possible according to the human detection state. According to a more specific feature, when a control signal from the external remote control unit is received and in addition human detection by the human detection sensor is present, the control signal reception portion turns the light emission portion normally on. According to another more specific feature, when a control signal from the external remote control unit is received and in addition human detection by the human detection sensor is absent, the control signal reception portion turns the light emission portion weakly on. Thus, with respect to a lighting device located within the communication range of the control signal of the external remote control unit, it is possible to change between normal lighting and weak lighting based on the human detection state according to remote control operation.

According to another specific feature, the control signal reception portion receives a control signal from another external lighting device. This makes possible refreshing of the lighting state coordinated with the lighting state in the external other lighting device. Thus, for example even when a lighting device is outside the communication range of the external remote control unit, it is possible to turn off the lighting device, for example, in a coordinated fashion with turning on of another lighting device. According to a more specific feature, the control signal reception portion receives from the external other lighting device a control signal which is a control signal forwarded from the external remote control unit.

According to another specific feature, the control signal reception portion receives lighting information of an external other lighting device, and the control portion controls the lighting state of the light emission portion based on the human detection state of the human detection sensor and the lighting information of the external other lighting device received by the control signal reception portion. This makes possible lighting control based on reception of the control signal and coordinated with the external other lighting device. According to a more specific feature, when no human detection by the human detection sensor is present and in addition the external other lighting device is normally on, the control signal reception portion turns the light emission portion weakly on. According to another more specific feature, when no human detection by the human detection sensor is present and in addition the external other lighting device is not normally on, the control signal reception portion turns off the light emission portion.

According to another specific feature, the lighting device further includes a signal transmission portion that transmits the lighting state of the light emission portion to an external other lighting device. This makes possible coordination with the external other lighting device according to changes in the lighting state.

According to another specific feature, the control portion has a plurality of control modes, and includes a signal transmission portion that transmits information on the control mode adopted by the control portion to the external other lighting device. According to a more specific feature, one of the plurality of control modes is a mode where the lighting state of the light emission portion is controlled based on the human detection state of the human detection sensor at the time point that the control signal reception portion receives a control signal, and in another of the plurality of control modes, the control portion controls the lighting state of the light emission portion at the time point that a change occurs in the human detection state of the human detection sensor. According to a still more specific feature, the signal transmission portion controls the lighting state of the light emission portion, and transmits a signal to the external other lighting device by visible light from the light emission portion.

According to another feature, a lighting device is provided that has: a light emission portion; a control portion that controls the lighting state of the light emission portion and that has a plurality of control modes; a reception portion that receives a control signal that determines the control mode; and a signal transmission portion that transmits information on the control mode adopted by the control portion to an external other lighting device. This makes possible coordination among a plurality of lighting devices having a plurality of control modes without confusion of the control mode. According to a specific feature, the lighting device further has a human detection sensor, and one of the plurality of control modes is a mode where the lighting state of the light emission portion is controlled based on the human detection state of the human detection sensor at the time point that the control signal reception portion receives a control signal, and another of the plurality of control modes is a mode where the lighting state of the light emission portion is controlled at the time point that a change occurs in the human detection state of the human detection sensor.

According to another feature, a lighting device is provided that has: a light emission portion; a control signal reception portion that receives a control signal; a control portion that controls the lighting state of the light emission portion based on the control signal received by the control signal reception portion; and a signal transmission portion that transmits the lighting state of the light emission portion to an external other lighting device. This makes possible reliable coordination among a plurality of lighting devices. According to a specific feature, the control signal reception portion receives from an external remote control unit a control signal with a limited reachable range. In such a case, the above-mentioned feature allows coordination with a lighting device located outside the reachable range of the control signal of the external remote control unit, and makes it possible, for example when the lighting device is turned on by remote control operation, to turn off in a coordinated fashion the lighting device located outside the reachable range of the control signal of the remote control unit. According to a more specific feature, until the control signal reception portion newly receives a control signal, the control portion maintains the previous control state.

According to another feature, a lighting system is provided that includes a plurality of lighting devices having various features as described above. Any one or combination of the various features described above makes it possible to coordinate the lighting devices provided within the lighting system as necessary.

INDUSTRIAL APPLICABILITY

The present invention finds application in lighting devices for use in comparatively large rooms and facilities, for example in factories and offices.

LIST OF REFERENCE SIGNS

10, 110, 210, 310, 410, 510 light emission portion
24, 124 human detection sensor
22, 122, 222, 322, 422, 522, 26, 126, 226, 326, 426, 526 control signal reception portion (first reception portion, second reception portion)
14, 114 control portion
6 remote control unit
10, 110, 210, 310, 410, 510 control signal transmission portion
10, 110, 210, 310, 410, 510 signal transmission portion

The invention claimed is:

1. A lighting device comprising:
   a light emission portion for emitting illumination light;
   an information reception portion for receiving information from an adjacent lighting device;
   a control signal reception portion operable to receive a control signal from a portable external remote control unit with a limited reachable range; and
   a control portion for controlling lighting state of the light emission portion according to the information received by the information reception portion and according to the control signal received by the control signal reception portion,
   wherein the control portion is arranged to turn on the light emission portion in response to the control signal within the limited reachable range and received by the control signal reception portion, and to turn off the light emission portion in response to the information received by the information reception portion, the information being indicative of a turn-on of the adjacent lighting device in response to the portable external remote control unit which has been brought out of the limited reachable range of the control signal reception portion and into the limited reachable range of the adjacent lighting device instead.

2. The lighting device according to claim 1, further comprising an information transmission portion for transmitting the information received by the information reception portion to another adjacent lighting device.

3. The lighting device according to claim 1, wherein until the control signal reception portion newly receives a control signal, the control portion maintains previous control state.

4. A lighting system comprising a plurality of the lighting devices according to claim 1.

5. The lighting device according to claim 1,
wherein the control portion is further arranged to turn off the light emission portion in response to the control signal from the portable external remote control unit within the limited reachable range.

6. The lighting device according to claim 1 further comprising a human detection sensor arranged to detect a presence of a person within a detection range, wherein the control portion is arranged to control the lighting state of the light emission portion further according to the human detection sensor.

7. A lighting device comprising:
a light emission portion for emitting illumination light;
a human detection sensor arranged to detect a presence of a person within a detection range;
a control signal reception portion that can receive a control signal from a portable external remote control unit; and
a control portion for controlling lighting state of the light emission portion based on the control signal received by the control signal reception portion and human detection state of the human detection sensor,
wherein the control portion is arranged to turn on the light emission portion in response to the control signal received by the control signal reception portion if the human detection sensor detects the presence of the person, and not to turn on the light emission portion in response to the control signal received by the control signal reception portion if the human detection sensor does not detect a presence of a person, whereby the control portion does not respond to the control signal received from the remote control unit unless the human detection sensor detects a presence of a person within a detection range.

8. The lighting device according to claim 7 further comprising an information transmission portion for transmitting information, wherein
the information is contained in illumination light of the light emission portion, and
the information transmission portion controls the light emission portion to forward the information signal to an adjacent lighting device.

9. The lighting device according to claim 7 further comprising an information reception portion for receiving information from an adjacent lighting device,
wherein the information is received from the adjacent lighting device by power line communication.

10. The lighting device according to claim 7 further comprising an information reception portion for receiving information from an adjacent lighting device, the control portion being arranged to control the lighting state of the light emission portion further based on the information, wherein
while no human detection by the human detection sensor is present, when the information reception portion receives information indicating that the adjacent lighting device has been turned on, the control portion makes the light emission portion emit light with light weaker than in a normally on state.

11. The lighting device according to claim 7 further comprising an information reception portion for receiving information from an adjacent lighting device, wherein
while the light emission portion is emitting light, when human detection state detected by the human detection sensor ceases to be present, if the information reception portion has received information indicating that the adjacent lighting device is on, the control portion makes the light emission portion continue light emission.

12. The lighting device according to claim 7, wherein until the control signal reception portion newly receives a control signal, the control portion maintains previous control state.

13. The lighting device according to claim 7 further comprising an information reception portion for receiving information from an adjacent lighting device.

14. The lighting device according to claim 7 further comprising an information transmission portion for transmitting information, wherein the control portion has a plurality of control modes, and wherein the information transmission portion is arranged to transmit information of a control mode adopted by the control portion to an external other lighting device.

15. The lighting device according to claim 14, wherein
one of the plurality of control modes is a mode where the lighting state of the light emission portion is controlled based on the human detection state of the human detection sensor at a time point that the control signal reception portion receives a control signal, and
in another of the plurality of control modes, the control portion controls the lighting state of the light emission portion at a time point that a change occurs in the human detection state of the human detection state.

16. The lighting device according to claim 14, wherein the information transmission portion controls the lighting state of the light emission portion so as to transmit the information to the external other lighting device by use of visible light from the light emission portion.

17. A lighting system comprising a plurality of the lighting devices according to claim 7.

18. A lighting system including a plurality of lighting devices comprising:
a first lighting device including a first light emission portion for emitting illumination light, a first information reception portion for receiving information from an adjacent lighting device, a first control signal reception portion that can receive a control signal from a portable external remote control unit with a limited reachable range and a first control portion for controlling lighting state of the first light emission portion according to the information received by the first information reception portion and by the control signal received by the first control signal reception portion; and
a second lighting device including a second light emission portion for emitting illumination light, a second information reception portion for receiving information from the first lighting device, a second control signal reception portion that can receive a control signal from the portable external remote control unit and a second control portion for controlling lighting state of the second light emission portion according to the information received by the second information reception portion and by the control signal received by the second control signal reception portion, wherein the first control portion is arranged to turn on the first light emission portion in response to the control signal within the limited reachable range and received by the first control signal reception portion, and wherein the second control portion is arranged to turn off the second light emission portion in response to the information received by the second information reception portion, the information being indicative of the turn-on of the first lighting device in response to the portable external remote control unit which is out of the limited reachable range to the second control signal reception portion.

19. A lighting system according to claim 18, wherein the second control portion is further arranged to turn on the second light emission portion in response to the control signal within the limited reachable range and received by the second control signal reception portion, the portable external remote control unit having been brought into the limited reachable range to the second control signal reception, and wherein the first control portion is further arranged to turn off the first light emission portion in response to the information received by the first information reception portion, the information being indicative of the turn-on of the second lighting device in response to the portable external remote control unit which has been brought out of the limited reachable range to the first control signal reception portion.

20. A lighting system according to claim 19, wherein the first control portion is further arranged to turn off the first light emission portion in response to the control signal from the portable external remote control unit within the limited reachable range, and wherein the second control portion is further arranged to turn off the second light emission portion in response to the control signal from the portable external remote control unit within the limited reachable range.

* * * * *